(12) United States Patent
Braun et al.

(10) Patent No.: US 10,661,511 B2
(45) Date of Patent: May 26, 2020

(54) ANISOTROPIC REINFORCEMENT OF COMPOSITE STRUCTURES

(71) Applicant: The Boeing Company, Chicago, IL (US)

(72) Inventors: Rudolf Braun, Winnipeg (CA); Benoit Ferre, Winnipeg (CA)

(73) Assignee: The Boeing Company, Chicago, IL (US)

( * ) Notice: Subject to any disclaimer, the term of this patent is extended or adjusted under 35 U.S.C. 154(b) by 989 days.

(21) Appl. No.: 14/864,591

(22) Filed: Sep. 24, 2015

(65) Prior Publication Data

US 2017/0087778 A1 Mar. 30, 2017

(51) Int. Cl.
*B29C 70/22* (2006.01)
*B29C 70/34* (2006.01)
(Continued)

(52) U.S. Cl.
CPC .............. *B29C 70/22* (2013.01); *B29C 70/34* (2013.01); *B64D 29/00* (2013.01);
(Continued)

(58) Field of Classification Search
CPC ......... B29C 35/02; B29C 65/02; B29C 70/34; B29C 65/48; B29C 65/5057; B29C 69/00; B29C 2791/006; B29C 2791/007; B29C 51/10; B29C 51/14; B29C 70/00; B29C 70/22; B29C 66/0222; B29C 66/0242; B29C 66/1122; B29C 66/343; B29C 66/545; B29C 66/73756; B29C 66/91941; B29C 66/45; B29C 66/71; B29C 66/721; B29C 66/7212; B29C 66/72141; B29C 66/72143; B29C 66/7392; B29C 66/7394; B29L 2101/10; B29L 2101/12; B29L 2009/00; B29L 2009/001; B29L 2031/085; Y10T 156/1044; Y10T 156/1062; Y10T 156/1075; B32B 27/08; B32B 27/06; B32B 28/1866; B32B 2603/00; B32B 37/04; B32B 37/12; B32B 2605/18;
(Continued)

(56) References Cited

U.S. PATENT DOCUMENTS 5,954,898 A * 9/1999 McKague .............. B29C 70/342
156/182
5,975,237 A 11/1999 Welch et al.
(Continued)

*Primary Examiner* — Camie S Thompson
(74) *Attorney, Agent, or Firm* — Kwan & Olynick LLP

(57) ABSTRACT

Provided are methods of forming composite structure over non-planar base structures and composite tools extending over cavities of the base structures. A tool may be formed from a composite layup cured on a flat mold. While applying the tool to the base structure, the tool may be bent around or about a bend axis. The bend axis may be parallel to continuous fibers within the tool. These fibers may span the full dimension of tool in the direction of the fibers. The continuous fibers extend across the cavity and provide stiffness to the tool in one direction even after bending of the tool. As such, the tool may withstand substantial forces in the direction perpendicular to its surface without collapsing into the cavity. In some embodiments, a composite structure may cured over the tool without impacting the size of the cavity on the other side of the tool.

25 Claims, 15 Drawing Sheets

(51) Int. Cl.
　　　*B64D 29/00*　　　　(2006.01)
　　　*B29K 101/10*　　　(2006.01)
　　　*B29K 101/12*　　　(2006.01)
　　　*B29K 105/08*　　　(2006.01)
　　　*B29L 9/00*　　　　(2006.01)
　　　*B29L 31/30*　　　　(2006.01)

(52) U.S. Cl.
　　　CPC ...... *B29K 2101/10* (2013.01); *B29K 2101/12* (2013.01); *B29K 2105/0809* (2013.01); *B29K 2713/00* (2013.01); *B29L 2009/00* (2013.01); *B29L 2031/3076* (2013.01)

(58) Field of Classification Search
　　　CPC . B32B 38/1866; F03D 1/0675; Y02E 10/721; Y02P 70/523; B29D 24/00; B29D 99/0003; B64F 5/10
　　　USPC ............. 156/182, 222, 264, 307.7; 264/258; 428/36.1
　　　See application file for complete search history.

(56) References Cited

U.S. PATENT DOCUMENTS

| | | |
|---|---|---|
| 8,795,455 B2 | 8/2014 | Blanchard et al. |
| 10,005,267 B1 * | 6/2018 | Boone ................ B32B 38/1866 |
| 2016/0121591 A1 * | 5/2016 | MacAdams ........... B32B 37/144 |
| | | 156/307.3 |
| 2016/0159057 A1 * | 6/2016 | Butler ................ B29C 35/0288 |
| | | 156/285 |

\* cited by examiner

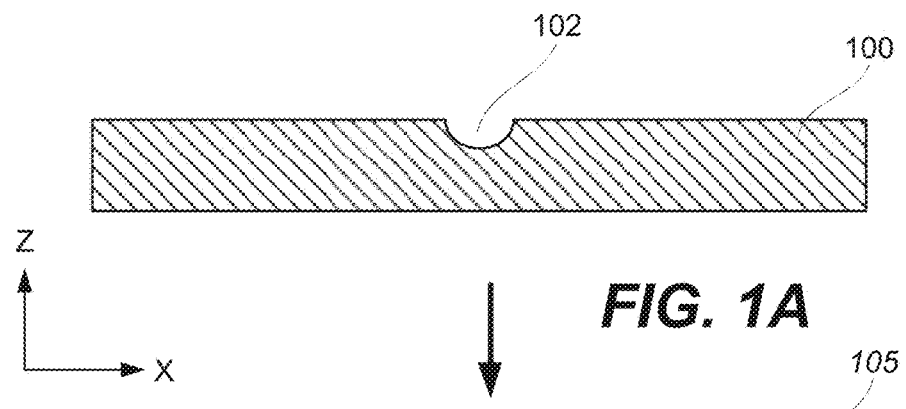
*FIG. 1A*
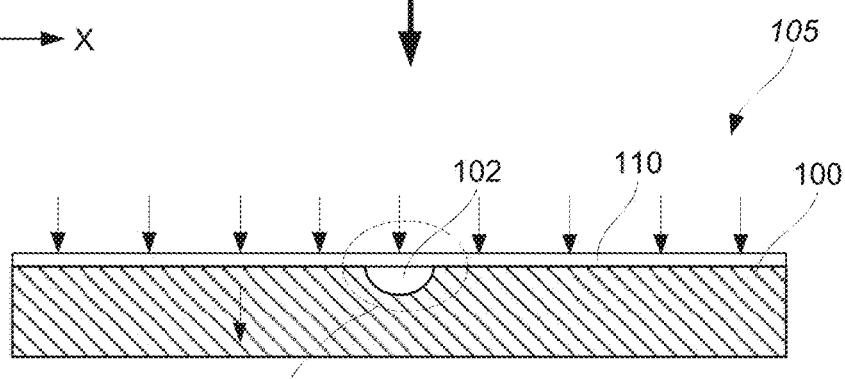
*FIG. 1B*
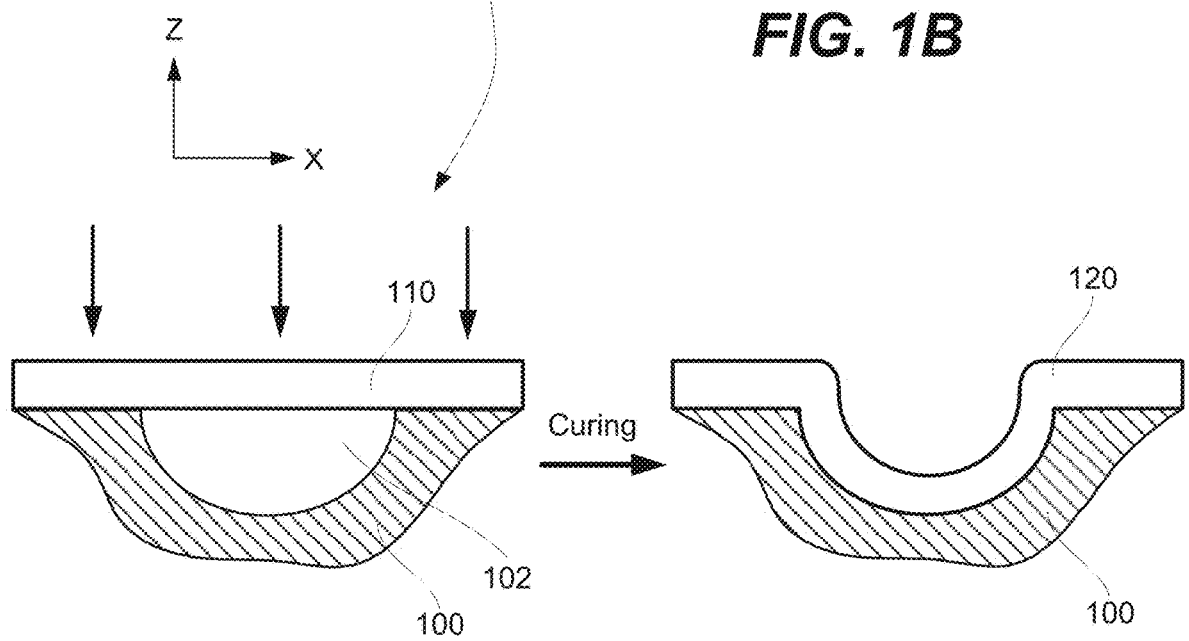
*FIG. 1C*  *FIG. 1D*

Curing

ANISOTROPIC REINFORCEMENT OF COMPOSITE STRUCTURES

BACKGROUND

Composite materials, such as fiber-reinforced materials, are being rapidly adopted for many new applications because of their light weight and exceptional strength. Some application examples include aerospace components (e.g., aircraft tail components, wing structures, fuselage skins, propellers, and the like), boats (e.g., hulls), bicycles (e.g., frames, sprockets), automotive (e.g., body panels, structural components, gas tanks), and the like. However, forming hollow cavities or channels at interfaces of composite structures still proved to be difficult. Specifically, it is desirable to cover a cavity with an uncured composite structure, which may be also referred to as a "green" composite structure. When the composite structure is uncured, it may be easily conformed to a surface of the structure having the cavity. As such, there is no need to develop different molds representing surfaces of different structures with cavities. Uncured composite structures may be initially formed on flat molds prior to applying to any curved surfaces. However, high pressures used for curing and consolidation of the composite structures tend to force these structures into any available cavities disposed on the underside of these structures effectively closing or "filling" these cavities

SUMMARY

Provided are methods of forming composite structure over non-planar base structures and composite tools extending over cavities of the base structures. A tool may be formed from a composite layup cured on a flat mold. While applying the tool to the base structure, the tool may be bent around or about a bend axis. The bend axis may be parallel to continuous fibers within the tool. These fibers may span the full dimension of tool in the direction of the fibers. The continuous fibers extend across the cavity and provide stiffness to the tool in one direction even after bending of the tool. As such, the tool may withstand substantial forces in the direction perpendicular to its surface without collapsing into the cavity. In some embodiments, a composite structure may cured over the tool without impacting the size of the cavity on the other side of the tool.

In some embodiments, a method of forming a composite structure comprises forming a composite layup, curing the composite layup thereby forming a tool, and changing a shape of the tool. After changing the shape of the tool, the method may also involve bridging over the cavity on a base structure with the tool.

In some embodiments, changing the shape of the tool comprises changing the shape of a matrix resin of the tool. More specifically, changing the shape of the matrix resin may comprise breaking the matrix resin of the tool, in some embodiments. For example, the matrix resin may be a thermoset resin. Furthermore, breaking the matrix resin of the tool may increase flexibility of the tool along a first direction while stiffness of the tool in a second direction remains unchanged. The second direction may be perpendicular to the first direction. In some embodiments, the tool comprises a first set of continuous fibers. The continuity of the first set of continuous fibers is maintained while breaking the matrix resin of the tool.

In some embodiments, changing the shape of the matrix resin comprises heating of at least a portion of the tool. Heating may also involve breaking the matrix resin of the tool. Alternatively, when the matrix resin is heated, the matrix resin may change its shape without breaking. The matrix resin may be a thermoplastic resin, for example.

In some embodiments, the composite layup comprises a first unidirectional ply comprising a first set of continuous fibers. The fibers in the first set of continuous fibers of the tool may extend parallel to each other and may extend across the cavity on the base structure. Furthermore, the fibers in the first set of continuous fibers of the tool and may extend perpendicular to a primary axis of the cavity on the base structure.

In some embodiments, the composite layup further comprises a second unidirectional ply and a multidirectional ply such that the multidirectional ply is disposed between the first unidirectional ply and the second unidirectional ply. The second unidirectional ply may comprise a second set of continuous fibers such that fibers in the second set of continuous fibers extend parallel to each other and to the first set of continuous fibers. The multidirectional ply may comprise a woven fabric having a fiber orientation relative to the first set of continuous fibers selected for achieving a maximum flexibility about one direction.

In some embodiments, changing the shape of the tool comprises bending the tool around a bend axis. The bend axis may not be parallel to a primary axis of the cavity on the base structure. More specifically, the bend axis may be perpendicular to the primary axis of the cavity on the base structure.

In some embodiments, the composite layup is cured on a mold having a planar surface. As such, when the tool formed from the composite layup is positioned over a curved surface, the tool needs to change shape. It should be noted that this shape change occurs after forming the tool (curing the composite layup).

In some embodiments, the base structure is used as a mandrel while changing the shape of the tool. For example, the composite layup may be cured on the planar mold while the base structure may have a non-planar structure. In order to conform the tool to this non-planar structure, the tool may be forced against the structure thereby changing the shape of the tool. Again, it should be noted that this operation occurs after forming the tool (curing the composite layup).

In some embodiment, the method also comprises forming a composite structure over the tool such that the tool is disposed between the base structure and the composite structure. Forming the composite structure may comprise curing the composite structure while in the composite structure is disposed over the tool and this curing may involve applying the pressure into the tool. The tool is configured to resist this pressure and prevent closing of the cavity in the base structure, which is disposed on the other side of the tool. In some embodiments, the matrix resin of the composite structure and the matrix resin of the tool are same. The tool separates the composite structure from the cavity of the base structure.

In some embodiments, a method of forming a composite structure comprises forming a composite layup, curing the composite layup thereby forming a tool, positioning the tool over a base structure, and forming a composite structure over the base structure and over and including the tool. The tool may be permanently attached to the composite structure. In some embodiments, the matrix resin of the composite structure and the matrix resin of the tool are same. The tool separates the composite structure from the cavity of the base structure.

In some embodiments, forming the composite structure comprises curing the composite structure while in the composite structure is disposed over the tool. This curing may involve applying the pressure into the tool. The tool is configured to resist this pressure and prevent closing of the cavity in the base structure, which is disposed on the other side of the tool.

The method may also comprise changing the shape of the tool. This shape changing may be performed prior to positioning the tool over the base structure. Alternatively, this changing may be performed while positioning the tool over the base structure. In some embodiments, changing the shape of the tool comprises changing a shape of a matrix resin of the tool.

More specifically, changing the shape of the matrix resin comprises breaking the matrix resin of the tool, in some embodiments. For example, the matrix resin is a thermoset resin. Breaking the matrix resin of the tool may increase flexibility of the tool along a first direction while stiffness of the tool in a second direction remains unchanged. The second direction may be perpendicular to the first direction. In some the tool comprises a first set of continuous fibers. The continuity of the first set of continuous fibers may be maintained while breaking the matrix resin of the tool.

In some embodiments, changing the shape of the matrix resin comprises heating of at least a portion of the tool. For example, the matrix resin is a thermoplastic resin.

In some embodiments, the composite layup comprises a first unidirectional ply comprising a first set of continuous fibers. Fibers in the first set of continuous fibers of the tool may extend parallel to each other and extend across the cavity on the base structure. More specifically, the fibers may extend perpendicular to the primary axis of the cavity on the base structure.

In some embodiments, the composite layup further comprises a second unidirectional ply and a multidirectional ply. The multidirectional ply may be disposed between the first unidirectional ply and the second unidirectional ply. The second unidirectional ply may comprise a second set of continuous fibers such that fibers in the second set of continuous fibers extend parallel to each other and to the first set of continuous fibers. In some embodiments, the multidirectional ply comprises a woven fabric having a fiber orientation relative to the first set of continuous fibers selected for achieving a maximum flexibility about one direction.

In some embodiments, changing the shape of the tool comprises bending the tool around the bend axis. The bend axis may be not parallel to a primary axis of a cavity on the base structure. Specifically, the bend axis may be perpendicular to the primary axis of the cavity on the base structure.

In some embodiments, the composite layup may be cured on a mold having a planar surface. For example, the composite layup may be cured on the planar mold while the base structure may have a non-planar structure. In order to conform the tool to this non-planar structure, the tool may be forced against the structure thereby changing the shape of the tool. Again, it should be noted that this operation occurs after forming the tool (curing the composite layup).

In some embodiments, the base structure is used as a mandrel while changing the shape of the tool. For example, the composite layup may be cured on the planar mold while the base structure may have a non-planar structure. In order to conform the tool to this non-planar structure, the tool may be forced against the structure thereby changing the shape of the tool. Again, it should be noted that this operation occurs after forming the tool (curing the composite layup).

Provided also is an assembly comprising a base structure and a tool. The base structure comprises a cavity and a non-planar surface. The tool contacts the non-planar surface of the base structure and extends over the cavity. The tool comprises a first set of continuous fibers. The fibers of the first set of continuous fibers extend parallel to each other and across the cavity on the base structure.

In some embodiments, the tool comprises a matrix resin bent at a bend area of the tool. The bend area may span the cavity. The matrix resin may be broken at the bend area of the tool. For example, the matrix resin may be a thermoset resin. Alternatively, the matrix resin may be a thermoplastic resin.

The tool further may also comprises a second set of continuous fibers extending parallel to each other to the first set of continuous fibers. The tool may also comprise a woven fabric disposed between the first set of continuous fibers and the second set of continuous fibers.

In some embodiments, the assembly also comprises a composite structure disposed over the tool such that the tool is between the composite structure and the base structure. The tool may be permanently attached to the composite structure and the base structure. The matrix resin of the composite structure and the matrix resin of the tool may have the same composition.

Also provided is an assembly comprising a tool comprising and a composite structure disposed at least in part over the tool and incorporating the tool when formed into the aircraft structure. The tool may comprise a composite material. The composite material may comprise a first set of continuous fibers.

In some embodiments, the assembly also includes a base structure comprising a cavity and a non-planar surface. The tool may contact the non-planar surface of the base structure and extend over the cavity such that fibers of the first set of continuous fibers extend parallel to each other and across the cavity on the base structure.

In some embodiment, the tool comprises a matrix resin bent at a bend area of the tool. The bend area may span the cavity. The matrix resin may be broken at the bend area of the tool. The matrix resin may be a thermoset resin. Alternatively, the matrix resin may be a thermoplastic resin. In some embodiments, the tool further comprises a second set of continuous fibers extending parallel to each other to the first set of continuous fibers. The tool may also comprise a woven fabric disposed between the first set of continuous fibers and the second set of continuous fibers. The matrix resin of the composite structure and the matrix resin of the tool may have the same composition.

These and other embodiments are described further below with reference to the figures.

BRIEF DESCRIPTION OF THE DRAWINGS

FIG. 1A is a schematic cross-sectional representation of a base structure having a cavity, in accordance with some embodiments.

FIG. 1B is a schematic cross-sectional representation of an assembly including the base structure of FIG. 1A and a composite layup, in accordance with some embodiments.

FIG. 1C is an expanded cross-sectional representation of a portion of the assembly of FIG. 1B illustrating the cavity of the base structure and the composite layup extending over the cavity, in accordance with some embodiments.

FIG. 1D is an expanded cross-sectional representation of the same assembly portion as shown in FIG. 1C after curing the composite layup and forming a composite structure illustrating a portion of the composite structure extending into the cavity of the base structure, in accordance with some embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Some applications involve curing a composite structure in contact with another structure while providing a channel between the two structures. The channel may be formed when at least one of these structures includes a cavity that is intended to remain hollow. FIG. 1A is a schematic cross-sectional representation of base structure 100 having cavity 102, in accordance with some embodiments. FIG. 1B illustrates base structure 100 covered with composite layup 110 prior to curing this composite layup 110 and forming composite structure 120. Composite layup 110 may be a planar structure and may extend over the mouth of cavity 102 at this stage. In other words, cavity 102 remains unfilled, as illustrated in the magnified view of FIG. 1C. However, when composite layup 110 is cured, a significant pressure (e.g., greater than 207 kPa (30 psig)) may be exerted on composite layup 110. The pressure may be used to consolidate different materials in composite layup 110 and eliminate voids in resulting composite structure. In some examples, composite layup 110 may be heated to soften its materials and enhance the flow of these materials during the consolidation. This pressure (sometimes in a combination with temperature) may cause composite layup 110 to buckle into the hollow space of cavity 102, thereby reducing the cross-sectional profile of cavity 102 and, in extreme cases, eliminating cavity 102 altogether. FIG. 1D is an expanded cross-sectional representation of a portion of composite structure 120 formed by the curing of the composite layup 110 in FIG. 1C. FIG. 1D illustrates an extreme case where composite structure 120 conforms to the top surface of base structure 100, effectively closing any gaps or cavities. While compression and consolidation of materials in composite layup 110 as well as conformal lining of base structure 100 with resulting composite structure 120 may be desirable, eliminating cavity 102 may need to be avoided. However, composite layup 110 may not be sufficiently self-supporting.

Figure 1E:
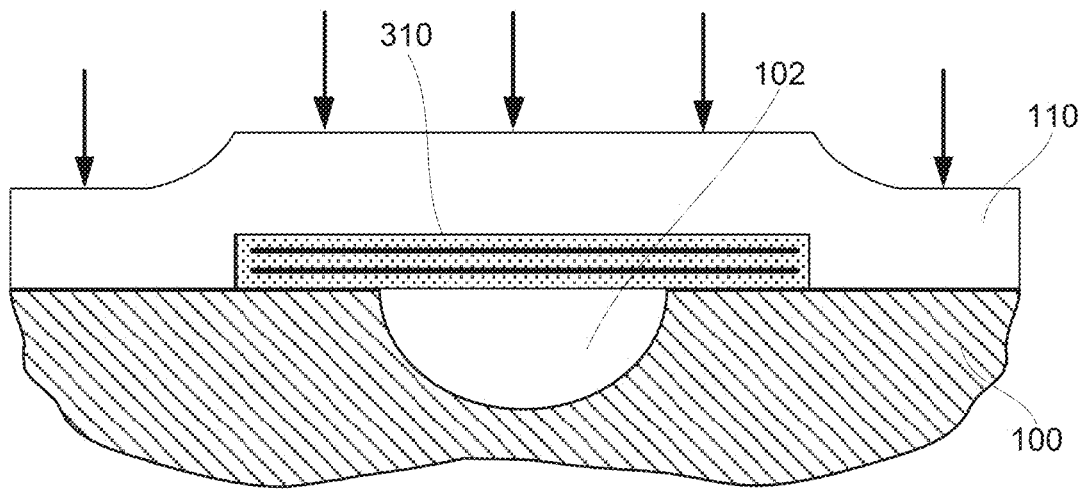
FIG. 1E is an expanded cross-sectional representation of a portion of the assembly of FIG. 1B illustrating the cavity of the base structure and the composite layup extending over the cavity, in accordance with some embodiments.
Figure 1F:
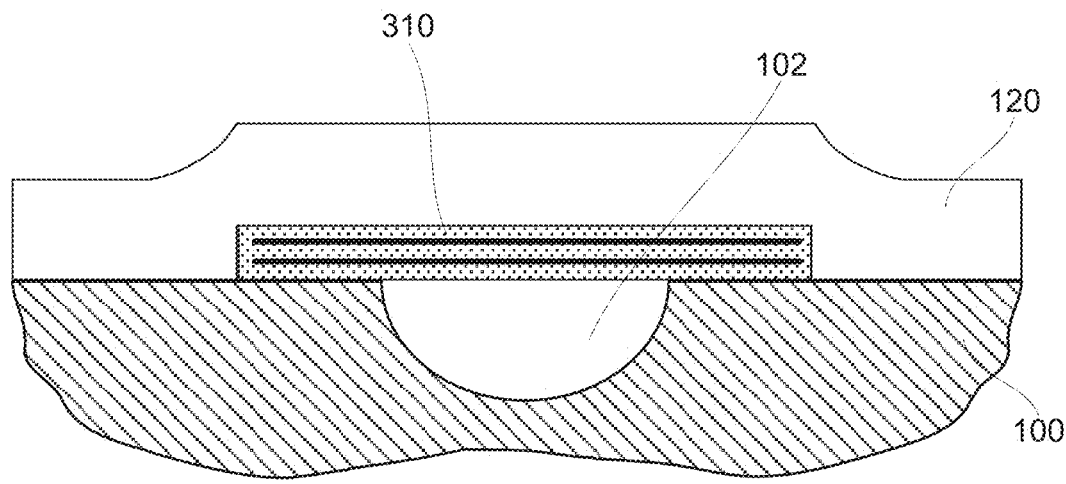
FIG. 1F an expanded cross-sectional representation of the same assembly portion as shown in FIG. 1E after curing the composite layup and forming a composite structure such the composite structure does not extend into the cavity of the base structure, in accordance with some embodiments.

To address this issue, tool 310 may be disposed between base structure 100 and composite layup 110 as, for example, shown in FIG. 1E. During curing, tool 310 may provide support to composite layup 110. As a result, cavity 102 may remain unobstructed as, for example, shown in FIG. 1F. It has been found that cavity 102 may be protected by tool 310, which may bridge over cavity 102. Once this bridging, which may be also referred to as a bridging support, is established over cavity 102 of base structure 100, composite structure 120 may be formed. For example, composite layup 110 may be formed over tool 310 followed by curing of composite layup 110. It should be noted that tool 310 may become a part of the assembly including composite structure 120 formed over tool 310. As such, tool 310 is different from conventional molds used for curing. Furthermore, composite structure 120 may be include (e.g., surround and/or otherwise mechanically integrated) tool 310. Tool 310 can be made from a composite material in order to integrate with the overall assembly and, in some embodiments, to integrate tool 310 with composite structure 120 and/or to integrate tool 310 with base structure 100.

Figure 1G:
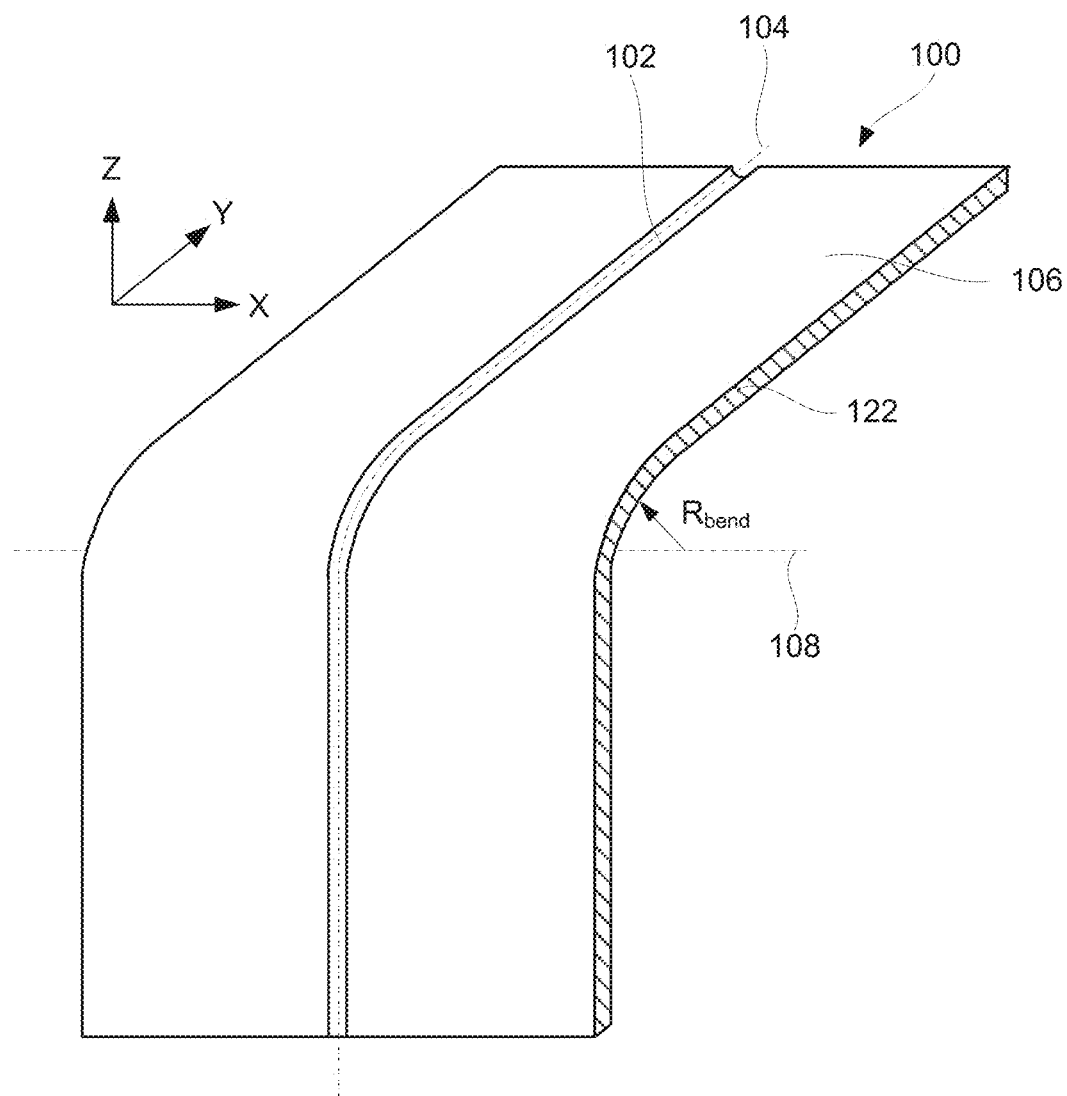
FIG. 1G is a schematic perspective representation of the base structure of FIG. 1A illustrating the non-planar surface of the base structure and bend axis, in accordance with some embodiments.
Figure 1H:
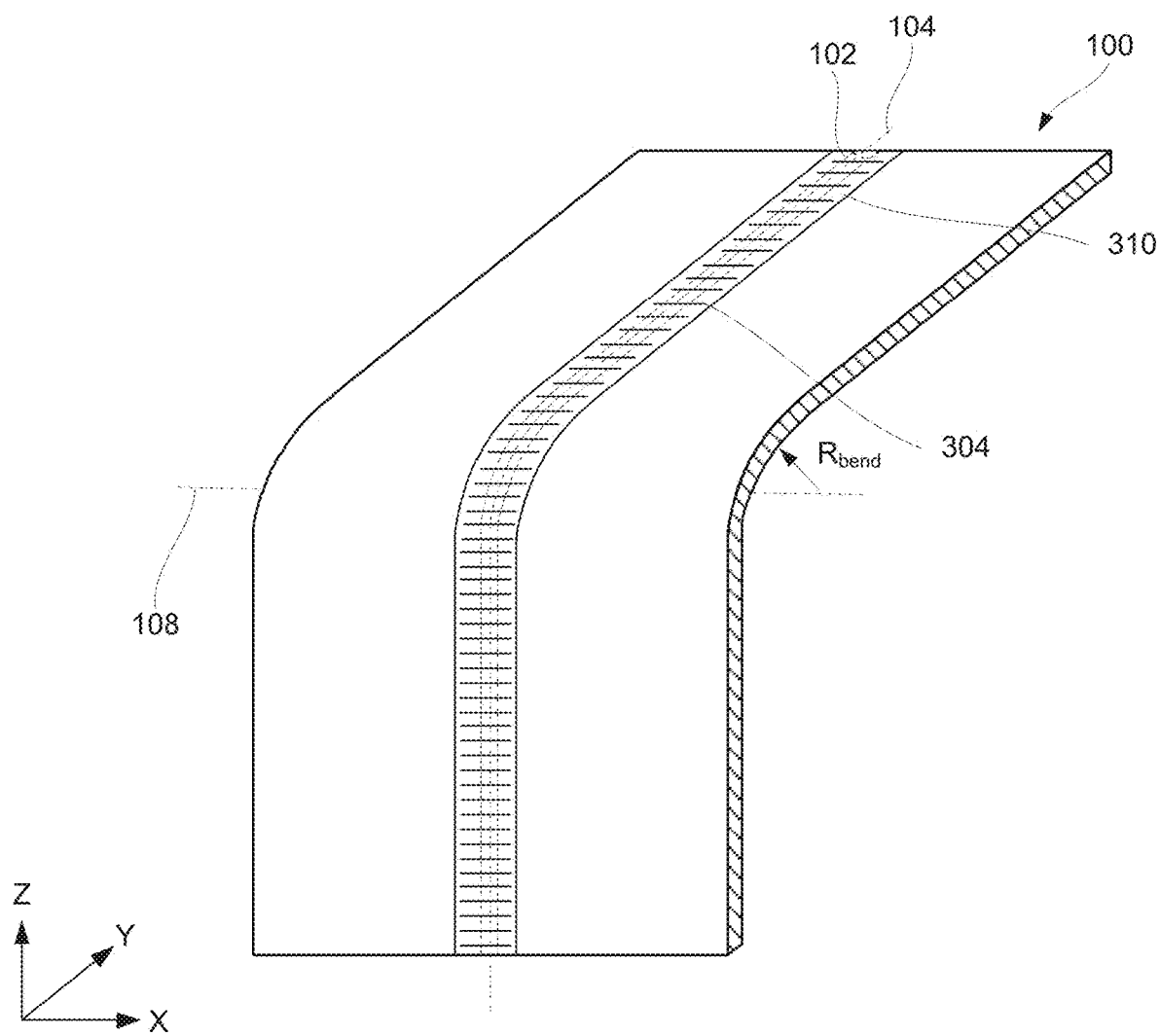
FIG. 1H is a schematic perspective representation of the base structure of FIG. 1G having a tool covering the cavity, in accordance with some embodiments.

It has been also found that composite tool 310 may be used over a non-planar surface of base structure 100. Specifically, the shape of composite tool 310 may be changed (after tool 310 has been cured). In some embodiments, the shape of composite tool 310 may be changes while tool 310 is being applied to base structure 100. In other words, base structure 100 may be operable as a mandrel for shaping cured composite tool 310. FIG. 1G is a schematic perspective representation of base structure 100 of FIG. 1A illustrating its non-planar surface 106, in accordance with some embodiments. For purposes of this disclosure, cavity 102 is not a part of non-planar surface 106. In this example, base structure 100 is bent around bend axis 108 but otherwise consists of two planar portions, one parallel to the X-Y plane and the other parallel to the X-Z plane. In order for a tool to work with base structure 100, it has to follow the shape of non-planar surface 106 without diminishing the space inside cavity 102. In other words, the tool preferably bends around bend axis 108 yet supports the load in the direction normal to non-planar surface 106 (the Z-direction) without substantially protruding into cavity 102. FIG. 1H is a schematic perspective representation of base structure 100 having tool 310 covering cavity 102. Tool 310 may include continuous fibers 304 extending across cavity 102. Use of continuous fibers 304 allows tool 310 to withstanding force, e.g., when curing a composite structure above tool 310 and cavity 102 as described above. Specifically, continuous fibers 304 may extend across cavity 102 as further explained below. Furthermore, the orientation of continuous fibers 304 may be such that tool 310 can be bent around or about one or more axes, such as axes extending perpendicular to primary axis 104 of cavity 102.

This disclosure describes different examples of methods of forming composite structure 110 that involve using composite tool 310. The resistance of tool 310 to bending depends on the angle between the applied bending force and the stiffness direction. The stiffness direction depends on the direction of fibers incorporated in tool 310. In other words, tool 310 is capable of resisting considerable bending force along its stiffness direction (along the direction of the fibers) and, at the same time, being flexible along a different axis (the flexibility direction). For example, the flexibility direction may be perpendicular to the stiffness direction.

This anisotropy of stiffness is achieved by the unidirectional orientation of the fibers in tool 310. When tool 310 is positioned over cavity 102 in base structure 100, the continuous unidirectional fibers parallel to the stiffness direction may bridge cavity 102, supporting the load imposed by, e.g., elevated pressure and/or temperature (e.g., during curing of another structure over tool 310). This strong bridge support preserves the intended size and shape of cavity 102 throughout curing or operations, which may involve application of other bending stresses to tool 310. Nevertheless fully cured planar composite tool 310 (e.g., fabricated without a specialized mold/fabricated on a planar mold) can be bent along its flexibility direction to conform to the curved surface of base structure 100.

Examples of Tools and Methods of Fabricating Thereof

Figure 2A:
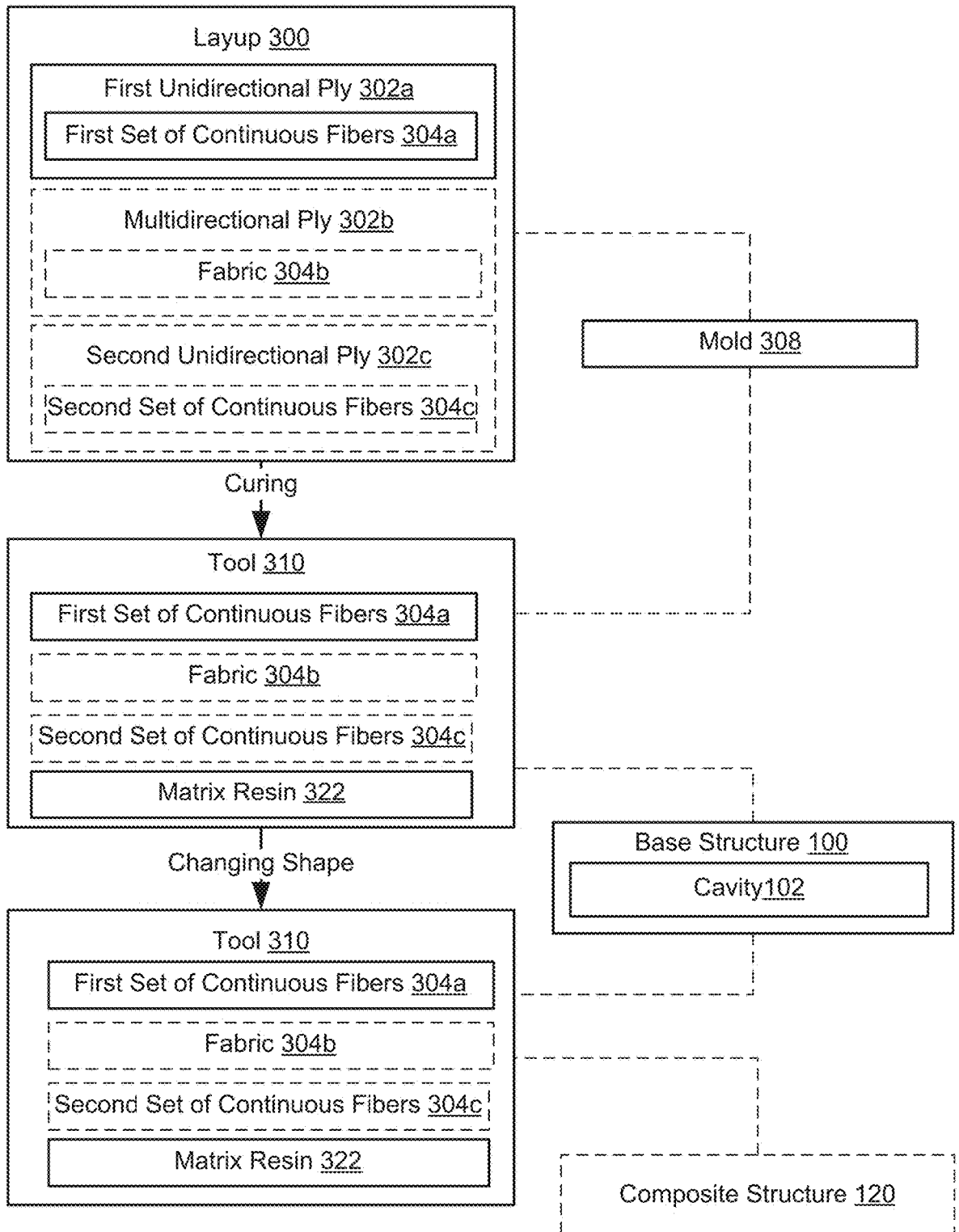
FIG. 2A is a flowchart of different components used during forming of a tool, in accordance with some embodiments.

FIG. 2A is a flowchart of different components (initial, intermediate, and final components), which are used during forming of tool 310, in accordance with some embodiments. FIG. 2A also illustrates various components and subassemblies that interact with tool 310 or composite layup used to form tool 310. Overall, this flowchart provides an overview of components and operations and provide some context for additional features of this disclosure presented later.

Composite layup 300 may include first unidirectional ply 302a. In some embodiments, composite layup may include multidirectional ply 302b, and second unidirectional ply 302c. As further described below when multiple unidirectional plies are provided, a multidirectional ply may be disposed between a pair of unidirectional plies. As such, multidirectional ply 302b may be disposed between first unidirectional ply 302a and second unidirectional ply 302c.

Unidirectional plies 302a and 302c may be anisotropically stiff. The axis of maximum stiffness (hereinafter "stiffness direction 330," see FIG. 3E) is designed to bear mechanical pressure without deforming, while the axis of minimum stiffness (hereinafter "flexibility direction 332," see FIG. 3E) is designed to be bendable to conform to non-planar surface 106. Multidirectional ply 302b is designed to hold unidirectional plies 302a and 302c together and prevent them from splitting apart at interstices between fibers in response to bending stress applied in the flexibility direction.

Both first unidirectional ply 302a and second unidirectional ply 302c may include continuous unidirectional (i.e., parallel) stiff fibers, e.g., first set of continuous fibers 304a and second set of continuous fibers 304c. These fibers may be held together by matrix resin 322. The fibers of first set of continuous fibers 304a and, if one is present, of second set of continuous fibers 304c should be distinguished from conventional fillers used in composite structures, such as short fibers, particles, randomly oriented fibers, non-parallel fibers. Specifically, first unidirectional ply 302a includes first set of continuous fibers 304a. Second unidirectional ply 302c, if one is present, include second set of continuous fibers 304c. When both plies 302 and 302c are present, the fibers in first continuous fiber set 304a may be parallel to the fibers in second continuous fiber set 304c. In some embodiments, first unidirectional ply 302a and second unidirectional ply 302c may be identical in fiber content, fiber thickness, ply thickness, fiber spacing, and resin characteristics. Alternatively, composite layup 300 may be asymmetric such that first unidirectional ply 302a differs from second unidirectional ply 302c in one more or characteristics.

In some embodiments, composite layup 300 includes multidirectional ply 302b, which may include woven fabric 304b. Multidirectional ply 302b may be disposed between first unidirectional ply 302a and second unidirectional ply 302c. Woven fabric 304b may be made from stiff fiber such as carbon, from more flexible fiber such as fiberglass or KEVLAR®, or from a combination of different fibers. A plain weave, a harness satin weave, a twill weave, or a different weave of woven fabric 304b may be used, depending on the desired specifications. Alternatively, first multidirectional ply 302b may be a stably bonded non-woven sheet including fibers oriented in a variety of directions. In some embodiments, the warp or weft of multidirectional ply 302b may be parallel to first continuous fiber set 304a and second continuous fiber set 304c. Alternatively, both the warp and weft of woven fabric 304b are oriented at non-zero angles to first continuous fiber set 304a and second continuous fiber set 304c.

As shown in FIG. 2A and further described below with reference to FIG. 2B, composite layup 300 may be cured on mold 308. Mold 308 may be a flat mold. This curing operations may form planar tool 310. Planar tool 310 may be later reshaped to change its shape.

Tool 310 may be a solid laminate, which, in some embodiments, includes first continuous fiber set 304a and, optionally, fabric 304b and second continuous fiber set 304c. First continuous fiber set 304a may come from first unidirectional ply 302a. Fabric 304b may come from multidirectional ply 302b. Finally, second continuous fiber set 304c may come from second unidirectional ply 304a. These plies are consolidated into tool 310. First continuous fiber set 304a, woven fabric 304b, and second continuous fiber set 304c may be all bound by matrix resin 322. Matrix resin 322 may be provided from one or more of first unidirectional ply 302a, second unidirectional ply 302c, multidirectional ply 302b, and/or another component.

Tool 310 can be applied as a bridge over cavity or, more specifically, over the mouth of cavity 102 in base structure 100. Tool 310 is specifically configured to keep cavity 102 open, for example, while overlying composite layup 110 is cured to form composite structure 120. Cavity 102 may be intended, for example, to drain away moisture or for some other task that would be thwarted by obstruction or collapse of cavity 102. In some embodiments, stiffness direction 330 of tool 310 (as shown in FIG. 4D and further described below) may be oriented crosswise to the long dimension of cavity 102, and flexibility direction 332 may be oriented lengthwise to the long dimension of cavity 102.

In some embodiments, if part of the surface of base structure 100 is planar, tool 310 may be applied over that part of cavity 102 as an unmodified planar tool. Then, upon reaching a curved section of non-planar surface 106 of base structure 100, the shape of tool 310 may be changed. As such, base structure 100 may be used a mandrel for shaping tool 310. Suitable methods of shape-changing may depend on the characteristics of matrix resin 322, and to a lesser extent on the bend radius of non-planar surface 106. These methods may include, without limitation, one or more of stretching, heating, or locally breaking (e.g., cracking or fragmenting) matrix resin 322 to provide and, in some embodiments, increase flexibility in flexibility direction 332 so that tool 310 may be fit to the curvature of non-planar surface 106.

In some embodiments, tool 310 may be placed in a jig (e.g., a mandrel that is different from base structure 100) or other tooling indicating the positions along the length of tool 310 that coincide with curved portions of non-planar surface 106 of base structure 100. Tool 310 may then be made more flexible at the indicated positions prior to its application to base structure 100. This facilitates the desirable shape changes when tool 310 is later applied to non-planar surface 106 of base structure 100. With this approach, multiple tools 310 can be made independently of base structures 100 or, more specifically, independently from different shapes that base structure 100 may take. In these embodiments, any heating and/or mechanical stress applied to tool 310 to increase its flexibility can be done remotely from base structures 100.

The three-ply laminate example used to form tool 310 and described herein is only one possible configuration used for anisotropic reinforcement. Depending on the needs of a given application, tool 310 used for anisotropic reinforcement may have more plies for greater strength or fewer plies for a thinner profile. A single layer of unidirectional continuous fibers may serve as an anisotropic reinforcement, particularly if the resin does not need to be broken to achieve the desired shape change. Alternatively, a single woven layer may serve as an anisotropic stiffener if the threads (e.g., formed by fibers) running in the desired stiffness direction 330 are stiffer (because of material, thickness, or both) than the threads running in other directions. If multiple unidirectional plies are used, each pair of unidirectional plies may be adhered together by another component, such as a multidirectional ply.

Figure 2B:
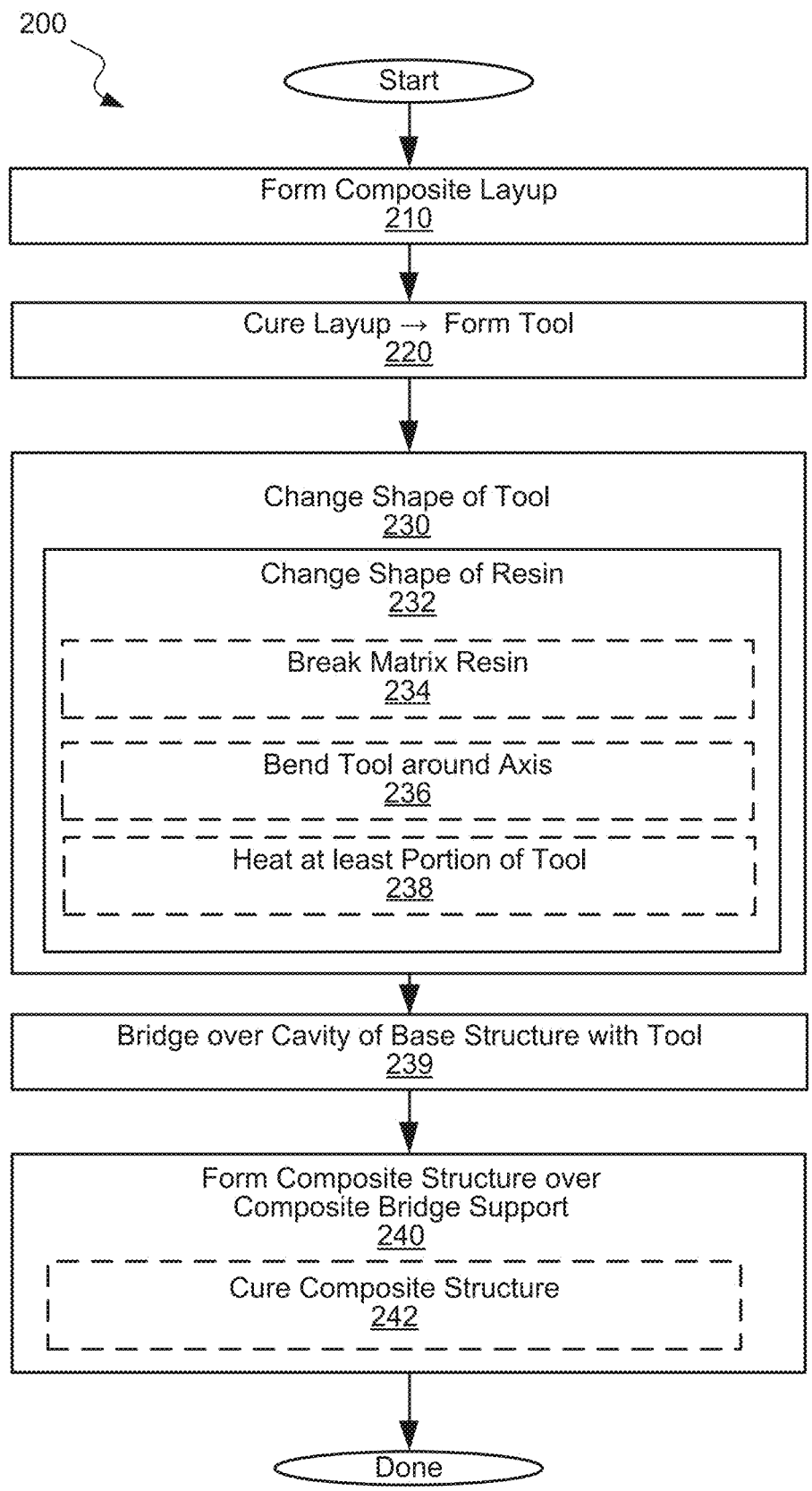
FIG. 2B is a process flowchart corresponding to a method of forming a tool over a base structure cavity, in accordance with some embodiments.

FIG. 2B is a process flowchart corresponding to method 200 of forming composite structure 120, which also involves forming tool 310, in accordance with some embodiments. In some embodiments, method 200 involves forming (block 210) composite layup 300. Composite layup 300 may comprise first unidirectional ply 302a, which in turn may comprise first set of continuous fibers 304a. As described above, composite layup 300 may also include other plies, e.g., second unidirectional ply 302c, multidirectional ply 302b. In some embodiments, one or more of these plies may include matrix resin 322.

When composite layup 300 includes second unidirectional ply 302c and multidirectional ply 302b, multidirectional ply 302b may be disposed between first unidirectional ply 302a and second unidirectional ply 302c. The orientation of the fibers in different plies is achieved during operation 210 and fixed during later operations, e.g., during curing of composite layup 300 as explained later. Specifically, second unidirectional ply 302c may comprise second set of continuous fibers 304c extending parallel to each other and to first set of continuous fibers 304a. In some embodiments, multidirectional ply 302b comprises woven fabric 304b having fiber orientation 306b relative to first set of continuous fibers 304a selected for achieving a maximum flexibility about one direction 330. For example, fiber orientation 306b of woven fabric 304b can be at +45/−45 relative to the orientation of first set of continuous fibers 304a as, for example, shown in FIG. 3C. Other orientation angles may be used as well depending on the flexibility direction (e.g., first direction 332 shown in FIG. 3E). Additional examples of composite layup 300 are also described below with reference to FIGS. 3A and 3B.

Method 200 may proceed with curing (block 220) composite layup 300 to form tool 310. Composite layup 300 may be cured on mold 308. In some embodiments, mold 308 has a substantially planar surface. This results in tool 310 being substantially planar. It should be noted that composite layup 300 is cured prior to applying tool 310 to base structure 100 and prior to forming composite structure 120 over tool 310.

During curing of composite layup 300 different plies forming composite layup 300 may consolidate. In some embodiments, operation 220 may involve applying heating and/or pressure to different plies of composite layup 300. Orientation of fibers achieved in composite layup 300 may be carried into tool 310. Specifically, fibers in second set of continuous fibers 304c may continue to extend parallel to each other and to the fibers of first set of continuous fibers 304a. The fibers of first set of continuous fibers 304a may also continue to extend parallel to each other. When multidirectional ply 302b is provided as a part of composite layup and when it comprises woven fabric 304b, the fiber orientation 306b relative to first set of continuous fibers 304a may be maintained during operation 220. As noted above, this orientation may be selected for achieving a maximum flexibility about one direction 330.

Method 200 may proceed with changing shape (block 230) of tool 310. Since tool 310 include matrix resin 322, this operation 230 involves changing shape (block 232) shape of matrix resin 322. It should be noted that matrix resin 322 supports at least first set of continuous fibers 304a. Depending on the processing condition and type of matrix resin 322, operation 232 may include various aspects as presented by blocks 234-238 in FIG. 2B. For example, operation 232 may involve optional breaking (block 234) of matrix resin 322 of tool 310. This breaking operation 234 increases flexibility of tool 310 along first direction 332, which is also referred to as a flexibility direction. In other words, flexibility along first direction 332 of tool 310 of tool 310 may be greater after resin breaking operation 234 than before. For example, during this operation at least one of bend angle 334a or bend radius 334b of tool 310 may exceed the yield point for matrix resin 322 in tool 310. Matrix resin 322 may be a thermoset resin or a thermoplastic resin. When the thermoplastic resin is used, breaking of matrix resin 322 may be avoided by, for example, selective heating tool 310 as further described below.

Even when matrix resin 322 is broken, first set of continuous fibers 304a extends across cavity 102 when tool is posited on base structure 100. More specifically, first set of continuous fibers 304a may extend in the direction perpendicular to primary axis 104 of cavity 102 when cavity 102 is an elongated structure having primary axis 104. In some embodiments, the stiffness of tool 310 in second direction 330 remains unchanged while breaking (block 234) matrix resin 322 of tool 310. Second direction 330 may be perpendicular to first direction 332. The continuity of first set of continuous fibers 304a is maintained while breaking (block 234) matrix resin 322 of tool 310.

In some embodiments, changing the shape (block 232) of tool 310 comprises optional bending (block 236) tool 310 around bend axis 334. Bend axis 334 may not be parallel to primary axis 104 of cavity 102 on base structure 100. For example, bend axis 334 may be perpendicular to primary axis 104 of cavity 102 on base structure 100. In some embodiments, bend axis 334 is parallel to first set of continuous fibers 304a.

In some embodiments, first unidirectional ply 302a used to form tool 310 comprises a thermoplastic resin. In these embodiments, resin shape changing operation 232 may involve heating (block 238) of at least a portion of tool 310. For example, selective heating around bend area 312 of tool 310 may be used.

In some embodiments, method 200 further comprises forming (block 240) composite structure 120 over tool 310. Tool 310 maintains the shape while forming composite structure 120. In some embodiments, forming (block 240) composite structure 120 comprises optional curing (block 242) composite structure at a pressure of at least about 207 kPa (30 psig). Matrix resin 122 of composite structure 120 and matrix resin 322 of tool 310 may be identical. Tool 310 separates composite structure 120 from cavity 102 of base structure 100. Composite structure 120 may be honeycomb 602.

In some embodiments, assembly 400 comprises base structure 100 comprising cavity 102 and non-planar surface 106. Assembly 400 also comprises tool 310 contacting the non-planar surface of base structure 100 and extending over cavity 102. Tool 310 comprises first set of continuous fibers 304a extending parallel to each other and extending across cavity 102 on base structure 100. Tool 310 further comprises matrix resin 322, which is broken at bend area 312 of tool 310. In some embodiments, matrix resin 322 is bent but not broken at bend area 312 of tool 310. The bend area 312 may span with the cavity 102.

In some embodiments, matrix resin 322 is a thermoset resin. In some embodiments, tool 310 further comprises second set of continuous fibers 304c extending parallel to each other to first set of continuous fibers 304a. Tool 310 may also comprise woven fabric 304b disposed between first set of continuous fibers 304a and second set of continuous fibers 304c.

In some embodiments, assembly 400 further includes composite structure 120 disposed over tool 310 such that tool 310 is between composite structure 120 and base structure 100. Matrix resin 122 of composite structure 120 and matrix resin 322 of tool 310 may have identical formulations. Composite structure 120 may be honeycomb 602.

Figure 3A:
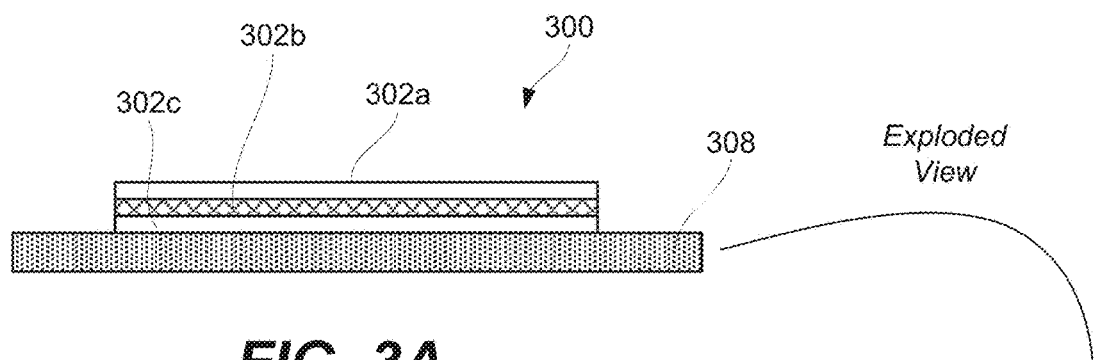
FIG. 3A is a schematic cross-sectional representation of a composite layup disposed on a mold, in accordance with some embodiments.
Figure 3B:
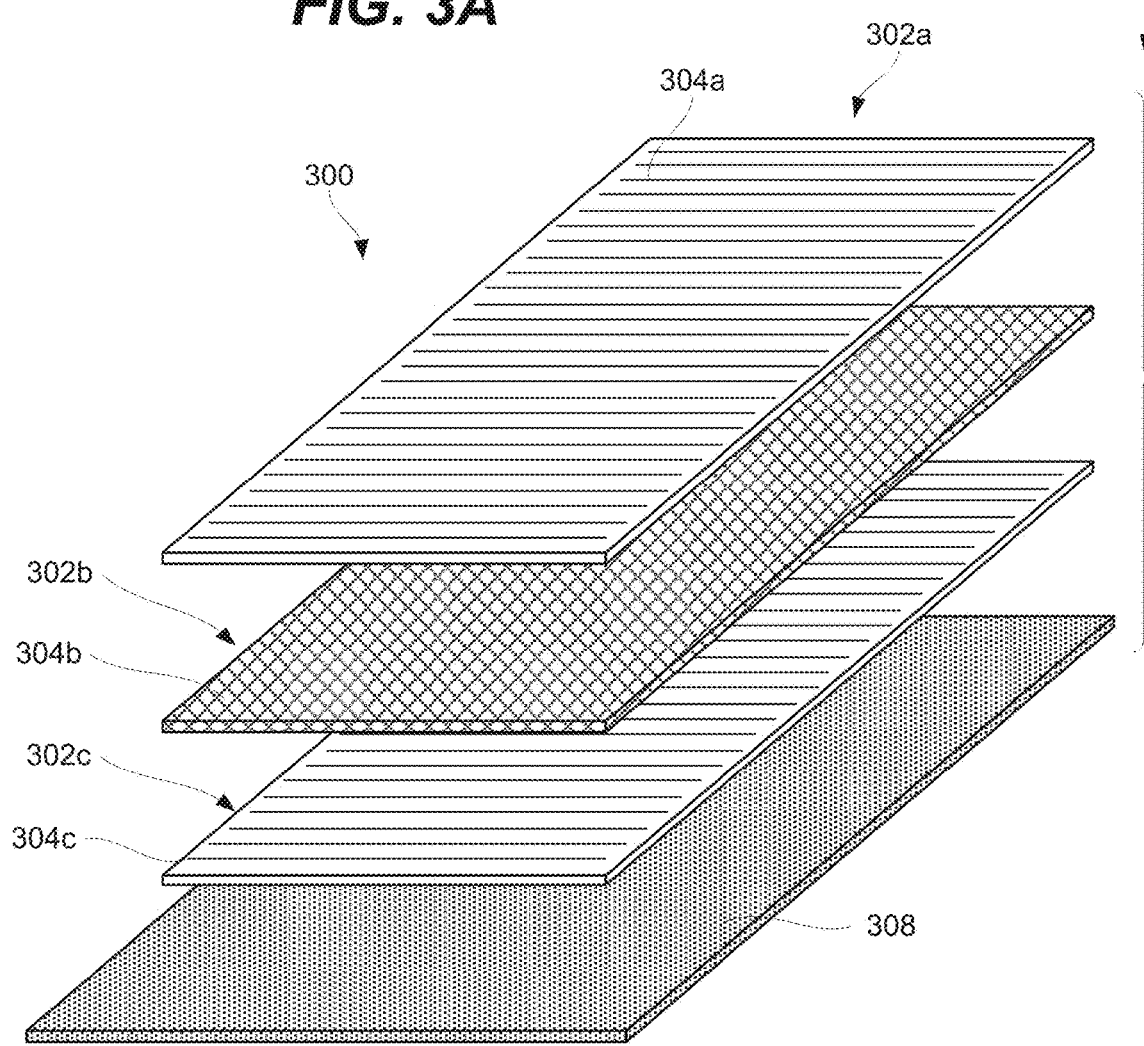
FIG. 3B is a schematic perspective expanded representation of the composite layup of FIG. 3A, in accordance with some embodiments.

FIGS. 3A-3E schematically illustrate the lay-up and curing of an example of a three-layer flat composite tool. Specifically, FIG. 3A is an end view, and FIG. 3B is an exploded perspective view, of ply layers being laid-up on the mold. In both figures, the lay-up uses a simple planar mold 308, which is significantly easier to produce, store, and replace than a mold with custom curvatures to match each base part, such as base structure 100 with its non-planar surface 106. As illustrated, the ply stack of composite layup 300 is symmetric, which eliminates the possibility of installing the tool "upside down" on base structure 100.

First unidirectional ply 302a and second unidirectional ply 302c, the outside plies in this example, work together to define the stiffness axis. First continuous fiber set 304a in first unidirectional ply 302a may be laid up parallel to second continuous fiber set 304c in second unidirectional ply 302c so that the stiffness anisotropies of the two layers reinforce each other.

First multidirectional ply 302b, the center ply in this example, may be a woven fabric 304b. Although this example relates to plain weave, any other suitable weave, such as twill or 4-, 5-, or 8-harness satin, may be used in appropriate embodiments. With all other factors (such as fiber thickness and sizing) being equal, plain-weave carbon fiber may contribute the most isotropic stiffness. If more flexibility is needed for small bend radii, a carbon twill, carbon harness satin, fiberglass plain weave, fiberglass twill, or fiberglass harness satin may be used for first multidirectional ply 302b. Although the example relates to homogeneous fabric, any suitable hybrid fabric such as carbon/fiberglass or carbon/KEVLAR® may be substituted. In particular, a hybrid fabric with warp threads of a first material and weft threads of a second material will be anisotropically stiff, with a stiffness axis parallel to the fibers of stiffer material (e.g., carbon, when the other material is fiberglass or Kevlar). If the stiffness axis (parallel to the carbon threads) of the hybrid woven fabric is aligned parallel to stiffness direction 330 of first unidirectional ply 302a, fewer plies or a less-rigid matrix resin 322 may be needed to achieve the maximum-stiffness target.

Figure 3C:
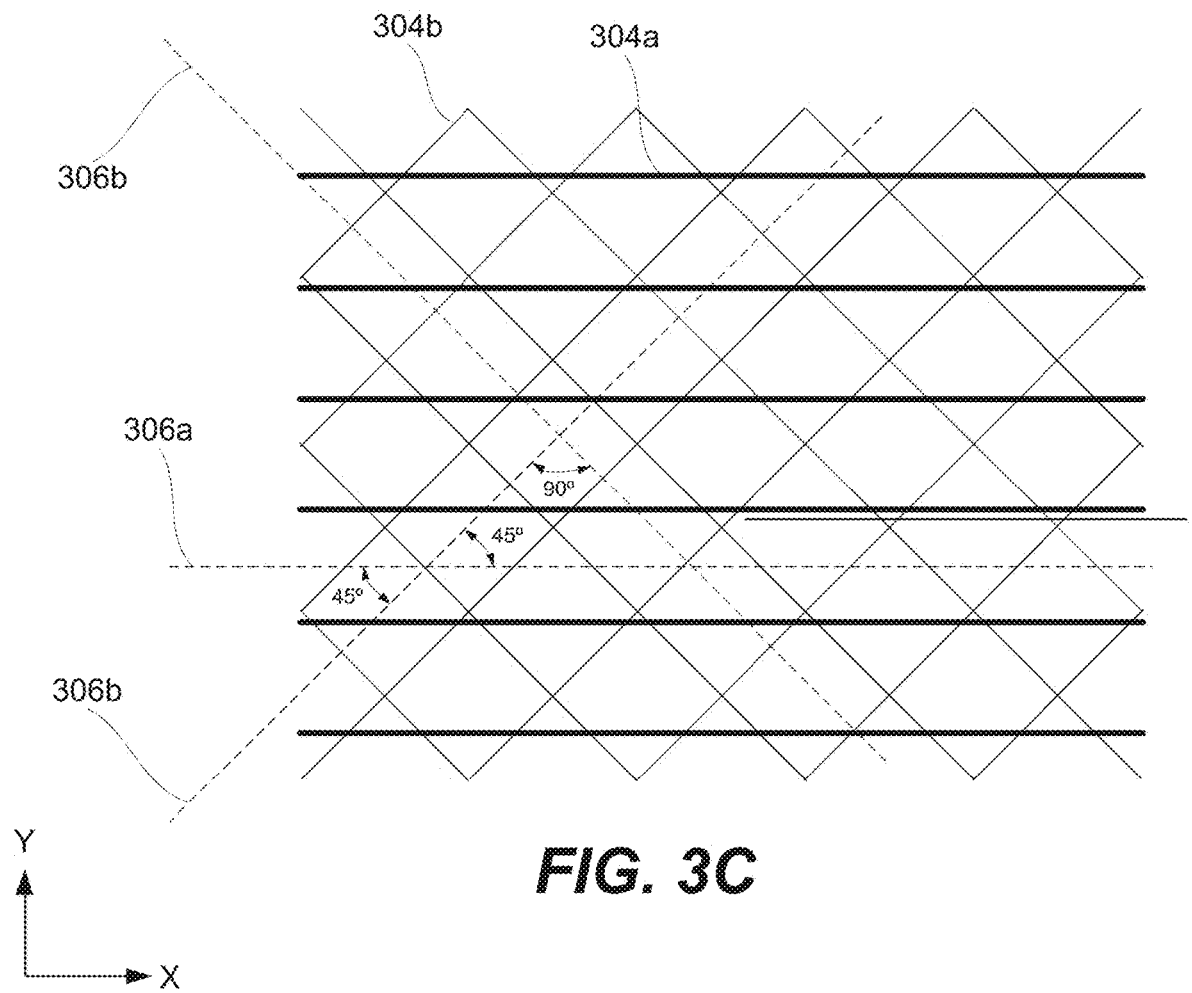
FIG. 3C is a schematic representation of fiber orientations in the composite layup of FIG. 3A, in accordance with some embodiments.

FIG. 3C is a schematic representation of fiber orientations in the composite layup of FIG. 3A, in accordance with some embodiments. Homogeneous plain-weave woven fabric 304b has one maximum-stiffness direction parallel to its warp threads and another of equal stiffness parallel to its weft, 90° from the warp. Its individual-layer flexibility directions are halfway between the individual-layer stiffness directions, e.g., 45°, 135°, 225°, and 315° from the warp.

Figure 3D:
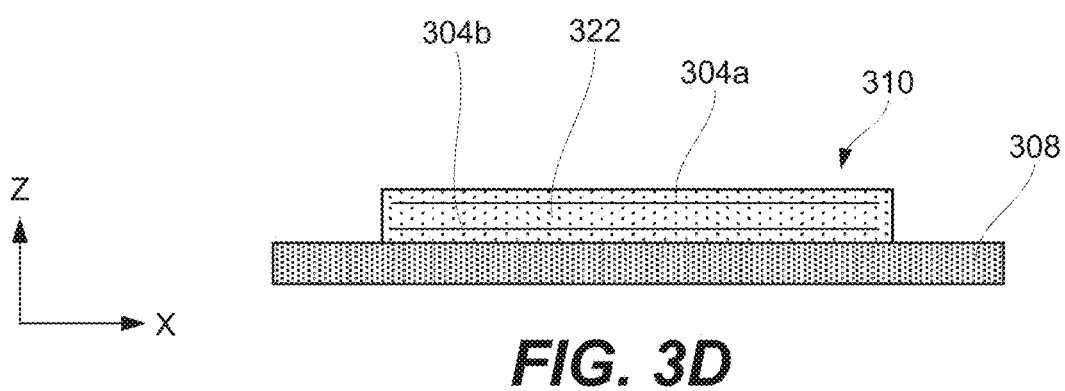
FIG. 3D is a schematic cross-sectional representation of a tool disposed on a mold, in accordance with some embodiments.
Figure 3E:
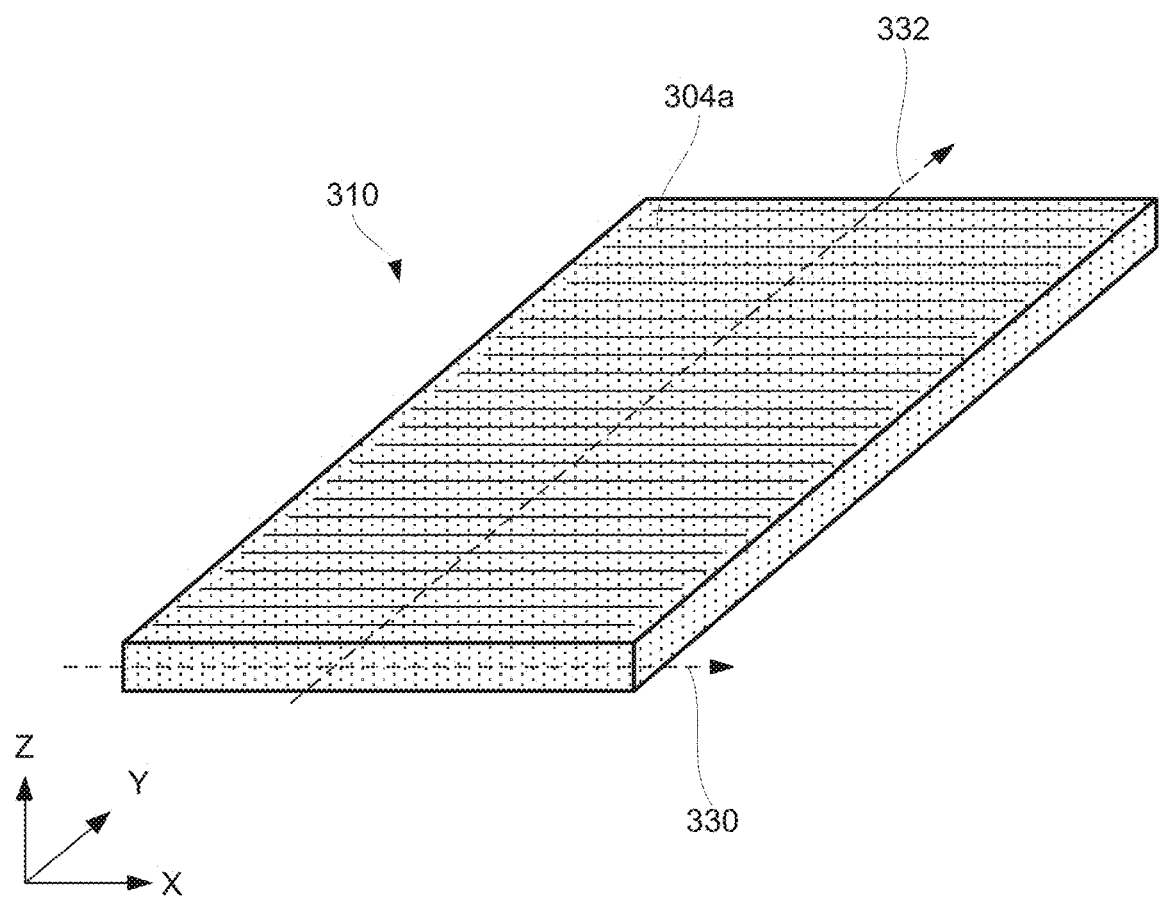
FIG. 3E is a schematic perspective representation of the tool, in accordance with some embodiments.

As illustrated, fabric fiber orientation 306b orients the warp and weft of woven fabric 304b "on the bias," or 45°, from unidirectional fiber orientation 306a to contribute the most flexibility to flexibility direction 332 of the tool (see FIG. 3E). In other words, the individual-layer flexibility direction of woven fabric 304b is perpendicular to unidirectional fiber orientation 306a.

Because the individual-layer flexibility directions of woven fabric 304b are 90° apart, another is aligned with unidirectional fiber orientation 306a, which will become stiffness direction 330 (see FIG. 4D) of tool 310. Therefore, woven fabric 304b will not contribute much additional stiffness in stiffness direction 330. Overall, if fibers are used in woven fabric 304b, these fibers may be more bendable than continuous fibers 304 of unidirectional plies 302. Continuous fibers 304 of unidirectional plies 302 do not bend during this operation.

Stiffness in stiffness direction 330 is provided by first continuous fiber set 304a and second continuous fiber set 304c. In some embodiments, this distribution of stiffness contribution between the plies may be an acceptable trade-off as the tool 310 is bent to fit non-planar surface 106 of base structure 100. Specifically, if tool 310 is held together only by resin, complete rupture of the resin will detach one lengthwise portion of tool 310 from the other.

Factors that increase the risk are brittleness of the selected matrix resin 322 (see FIG. 4A) after curing and small size of minimum bend radius 334b. Brittle resins may need to be broken (fragmented with small, shallow cracks) to bend tool 310 along the flexibility direction. While some applications may tolerate splicing the pieces together over cavity 102, other applications may not. One or more plies of woven fabric 304b embed diagonal fiber in matrix resin 322. The diagonal fibers may obstruct the propagation of cracks through the thickness of tool 310, and hold the fibers together even if a crack penetrates the full thickness of tool 310.

In some embodiments (e.g., a hybrid fabric or a non-plain weave), the individual flexibility direction of woven fabric 304b may be at an angle other than 45° from the warp. However, these different angles may be found in reference materials such as manufacturer's catalogs, or alternatively calculated or measured without undue experimentation. Once known, the individual flexibility direction of woven fabric 304b may be aligned perpendicular to unidirectional fiber orientation 306a, i.e., along flexibility direction 332 of the tool (see FIG. 3E).

FIG. 3D is a schematic cross-sectional representation of tool 310 disposed on mold 308, in accordance with some embodiments. First continuous fiber set 304a and parallel second continuous fiber set 304c are primary contributors to the anisotropic stiffness of tool 310. Matrix resin 322 hardens to bind the plies together and add an amount of isotropic stiffness that depends on the resin composition.

FIG. 3E is a schematic perspective representation of tool 310, in accordance with some embodiments. In this example, Flexibility direction 332 is perpendicular to first continuous fiber set 304a. Stiffness direction 330 is parallel to first continuous fiber set 304a.

Figure 4A:
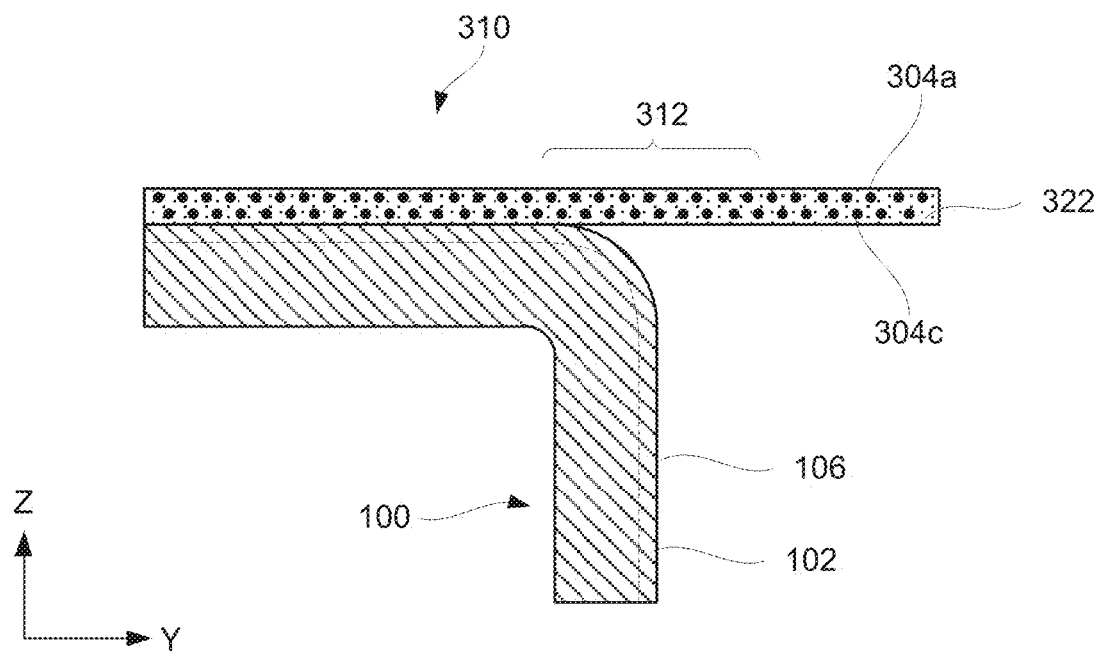
FIG. 4A is a schematic cross-sectional representation of a tool and a base structure prior to changing the shape of the tool, in accordance with some embodiments.
Figure 4B:
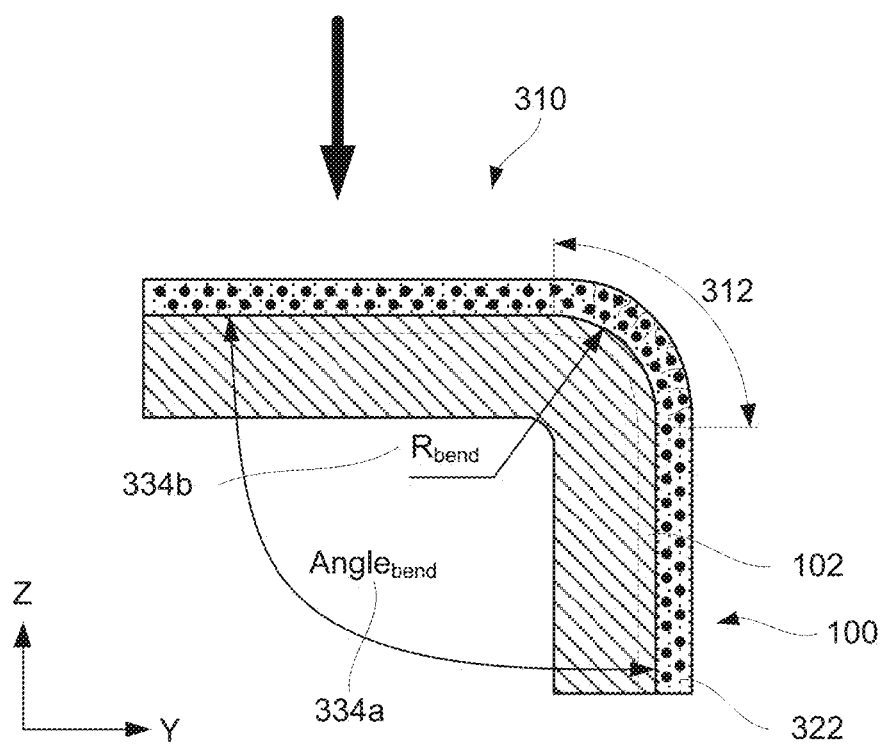
FIG. 4B is a schematic cross-sectional representation of the tool (also shown in FIG. 4A) after changing its shape, in accordance with some embodiments.
Figure 4C:
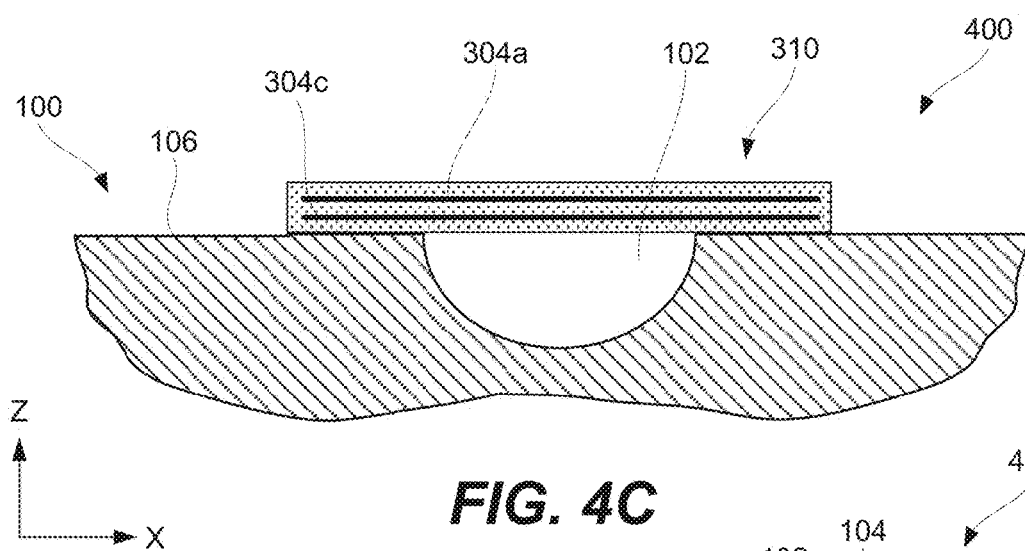
FIG. 4C is another schematic cross-sectional representation of the tool of FIG. 4B, in accordance with some embodiments.
Figure 4D:
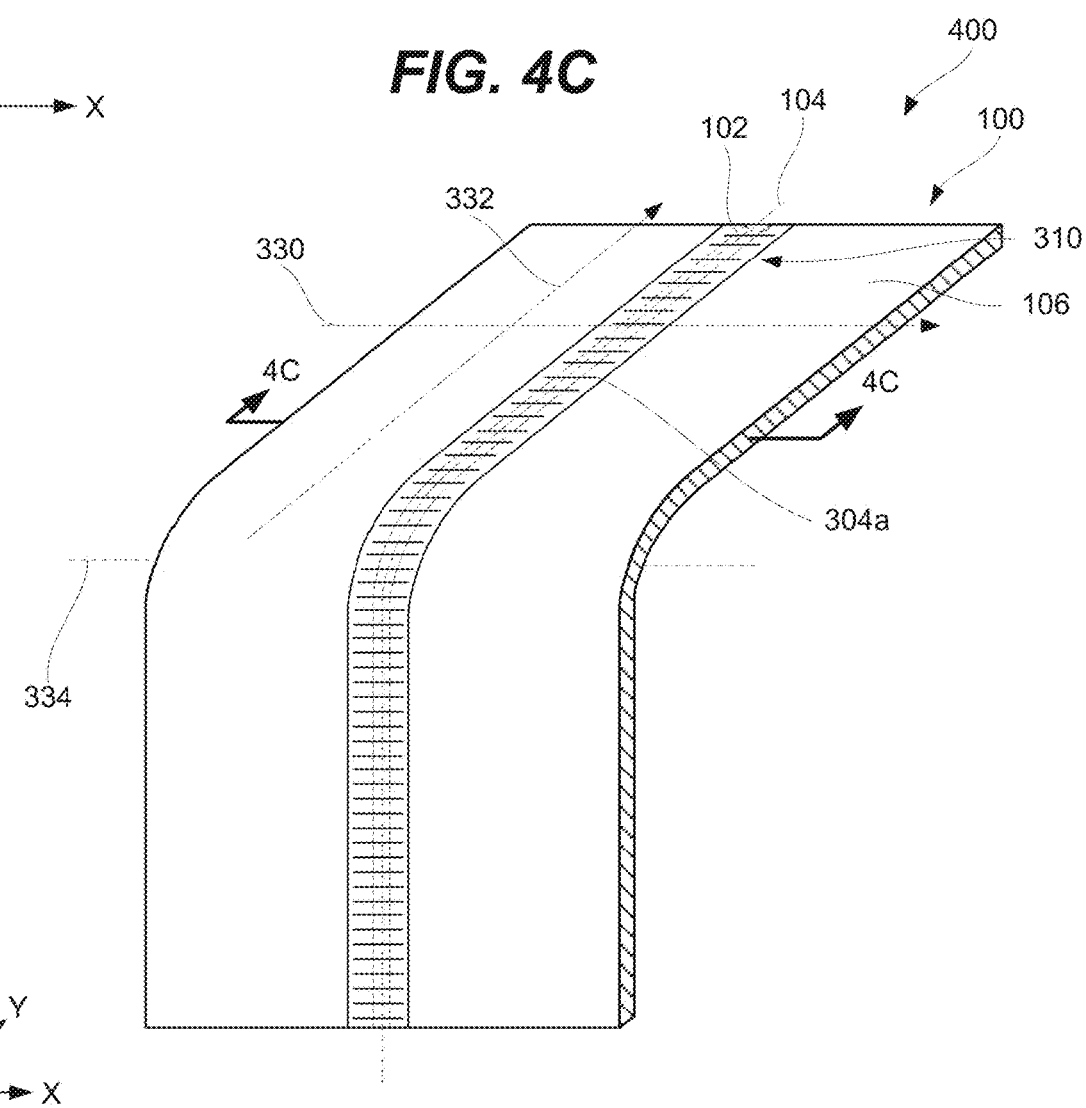
FIG. 4D is a schematic perspective representation of a base structure with the tool of FIG. 4B, in accordance with some embodiments.

FIGS. 4A-D schematically illustrate changing the shape of tool 310. Specifically, FIG. 4A is a schematic cross-sectional representation of tool 310 and based structure 100 prior to changing the shape of tool 310. As noted above, this shape change may occur while applying tool 310 to base structure 100. As such, base structure 100 may be operable as a mandrel during this shape changing operation. Tool 310 may be initially flat. For example, tool 310 may formed on mold 308. At the same time, as a whole, base structure 100 has non-planar surface 106. Yet the part of non-planar surface 106 near cavity 102 includes some planar portions as well as the non-planar portions. Flat tool 310 can be applied to a planar portion without reshaping. In some embodiments, tool 310 may be applied "as-is" to as many planar or approximately planar portions as possible to conserve tool 310's overall structural strength in the stiffness direction.

At bend area 312, a gap develops between flat tool 310 and non-planar surface 106 of base structure 100. This is where reshaping may be desirable to conform tool 310 to a curved section of non-planar surface 106 around cavity 102. Note that first continuous fiber set 304a and second continuous fiber set 304c are oriented perpendicular to the plane of this view. The continuous fibers of first continuous fiber set 304a and second continuous fiber set 304c will not need to bend when tool 310 is reshaped to in band area 312, e.g., to conform to the rounded corner of non-planar surface 106 on base structure 100. This curve can be fit by changing the shape of matrix resin 322.

Different reshaping approaches may be available, depending on characteristics of matrix resin 322 and other factors. When matrix resin 322 is a thermoset resin, for example, it may be "broken" so that cracks form, small resin crumbs may detach, and tool 310 becomes more flexible along an axis perpendicular to the continuous fibers (and, at least in this example, parallel to the long axis of cavity 102). In some embodiments, the force used to break matrix resin 322 may be distributed in and near bend area 312 to produce many shallow cracks rather than a few deep cracks. Gaining a performance advantage from intentional, controlled fragmentation of thermoset matrix resin is therefore an unexpected result.

Thermoplastic resin may be broken like thermoset, or it may be locally heated in and near bend area 312 until it softens enough to become flexible, and held in position against the curve of non-planar surface 106 until it cools and re-hardens.

Elastomeric or other flexible resin may be sufficiently bendable to fit the curve without disturbing the structure. Since these resins do not add much stiffness, a thicker fiber may be preferable in the unidirectional layer(s) compared to the fiber thickness used with harder resins.

FIG. 4B is a schematic cross-sectional representation of tool 310 after changing its shape (in comparison to FIG. 4A), in accordance with some embodiments. Bend area 312 of tool 310 is fitted to underlying bend radius 334b and bend angle 334a of non-planar surface 106 of base structure 100. Cracks (or other defects caused by bending) in matrix resin 322 are schematically shown in this view. Another planar portion of the surface follows the bend of radius 334b and angle 334a, so the flat tool 310 needs no further alteration past bend area 312. Having been fitted to the entire length of cavity 102, tool 310 has been processed to become tool 310.

FIG. 4C is another schematic cross-sectional representation of the tool of FIG. 4B, in accordance with some embodiments. Tool 310 bridges cavity 102, with first continuous fiber set 304a and second continuous fiber set 304c spanning the width of cavity 102 along its entire length. The continuity of tool 310 is expected to exclude any overlying uncured composite from sagging or protruding into cavity 102 and obstructing it. The stiffness of tool 310 is expected to counter exterior forces (such as a high autoclave pressure) that may otherwise tend to collapse cavity 102.

FIG. 4D is a schematic perspective representation of a base structure with the tool of FIG. 4B, in accordance with some embodiments. tool 310 covers cavity 102 with first continuous fiber set 304a and second continuous fiber set 304c oriented perpendicular to primary axis 104, i.e., crosswise to the long dimension of cavity 102. Assembly 400 is now ready for lay-up of overlying composite structure 120. In some embodiments, tool 310 may be bonded in place, e.g., with adhesive. Alternatively, the geometry of base structure 100 may permit tool 310 to be placed over cavity 102 without adhesive, to be held in place temporarily by gravity and then by composite structure 120 formed above and around it.

Figure 5A:
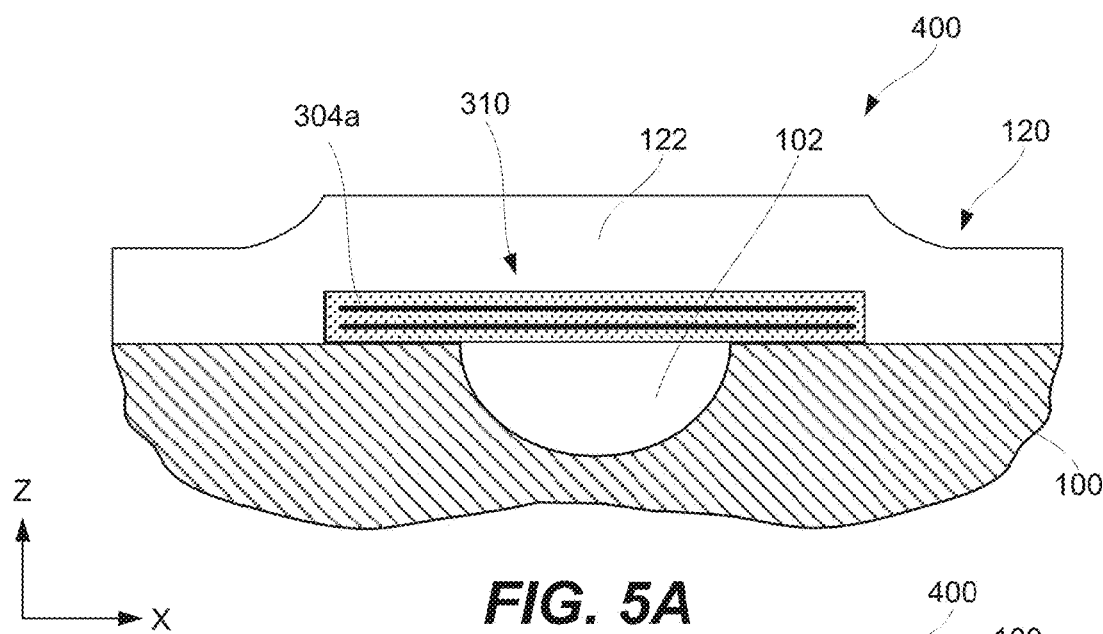
FIG. 5A is a schematic cross-sectional representation of an assembly including the tool of FIG. 4B and a composite structure, in accordance with some embodiments.
Figure 5B:
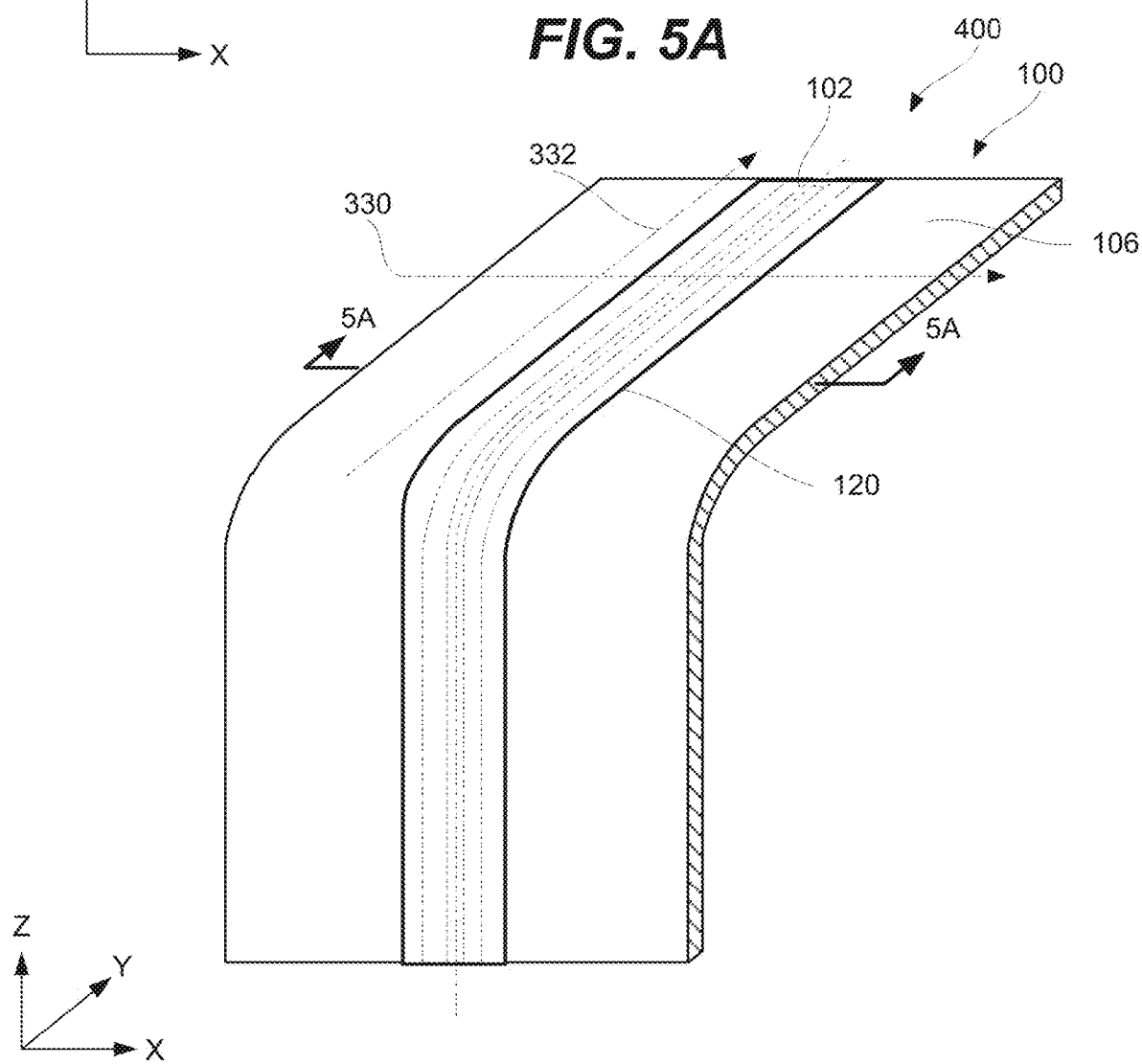
FIG. 5B is a schematic perspective representation of a base structure with the tool of FIG. 4B and the composite structure, in accordance with some embodiments.

FIGS. 5A and 5B are views of a finished assembly 400 of base structure 100 with cavity 102 bridged by tool 310, which in turn is overlaid with composite structure 120. Specifically, FIG. 5A is a schematic cross-sectional representation of an assembly including the tool of FIG. 4B and a composite structure, in accordance with some embodiments. Cavity 102 in base structure 100 is open and unobstructed. The section line is perpendicular to first continuous fiber set 304a, which define stiffness direction 330. Because of the strength of tool 310 in stiffness direction 330, composite structure 120 did not protrude or collapse into cavity 102 while being cured.

FIG. 5B is a schematic perspective representation of a base structure with the tool of FIG. 4B and the composite structure, in accordance with some embodiments. Base structure 100 has non-planar surface 106. However, the non-planarity affecting the vicinity of cavity 102 is parallel to the long dimension of cavity 102. Orienting tool 310 with its flexibility direction 332 along the curvature of non-planar surface 106 gave it the ability to fit and follow the curvature of non-planar surface 106 to effectively seal tool 310 around cavity 102. Meanwhile, stiffness direction 330, oriented crosswise to cavity 102, prevented composite structure 120 from sagging into and obstructing cavity 102.

Application Example

Figure 6:
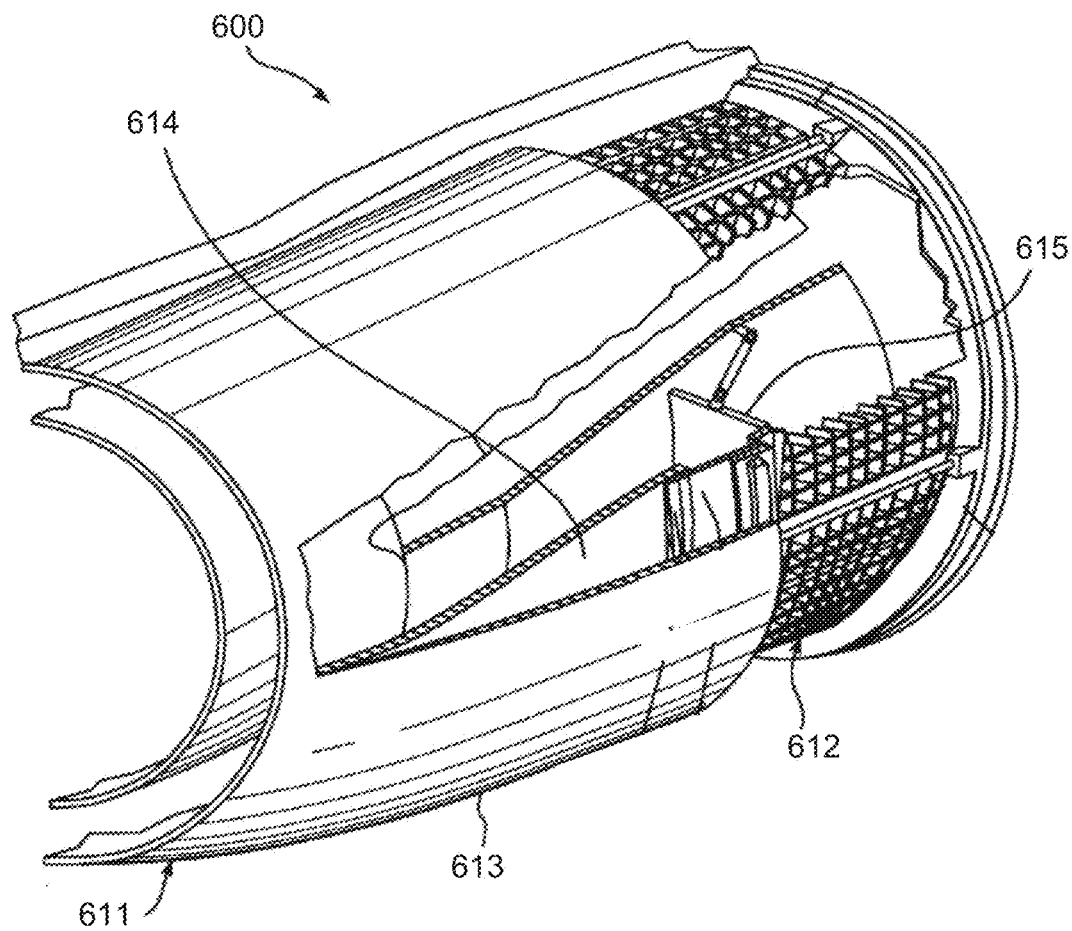
FIG. 6 is a schematic perspective representation of a nacelle for a high-bypass jet engine.

FIG. 6 is a cutaway perspective view of nacelle 600 for a high bypass jet engine including composite outer cowl panels 613 and composite acoustic panels 614 formed as honeycomb cores. Such panels are an example of a potential application for the anisotropic reinforcements described herein. Nacelle 600 includes a thrust reverser assembly having fore-and-aft translating sleeve 611 to cover or expose thrust reverser cascades 612 when deploying thrust reverser blocker doors 615 carried on the translating sleeve. The thrust reverser assembly may be fitted within nacelle 600 and positioned just aft of an aircraft jet engine, not shown. Thrust reverser cascades 612 are circumferentially spaced around the interior of the nacelle.

A pair of semi-cylindrical inner acoustic panels 614 are bonded together to form the aft portion cylindrical nacelle 600. Outer cowl panels 613 and acoustic panels 614 are bonded at their aft ends and branch or diverge to provide a chamber for containing and concealing the thrust reverser cascades 612 and the associated support structures. When translating sleeve 611 is in the stowed position, the leading ends of acoustic panel 614 and outer cowl panel 613 extend on opposite sides of thrust reverser cascades 612. When the thrust reverser is deployed, translating sleeve 611 is moved aft to expose cascades 612. Fan duct blocker doors 615 at the forward end of acoustic panel 614 are deployed to divert fan flow through the cascades 612.

When deployed to cover thrust reverser cascades 612, acoustic panels 614 attenuate acoustic noise produced by the thrust reverser assembly while the aircraft lands, taxis, and slows to a stop. Outer cowl panels 613 and acoustic 614 may include honeycomb core covered with one or more composite layers, which may be referred to as face sheets. The composite layers may include cavities, e.g., for draining condensation or other moisture from the interior of the panel. To ensure that the cavities stay open and unobstructed through curing and other pressure changes, tools described above may be used to bridge the mouth of the cavity underneath an adjacent composite layer.

Examples of Aircraft and Methods of Fabricating and Operating Aircraft

Figure 7:
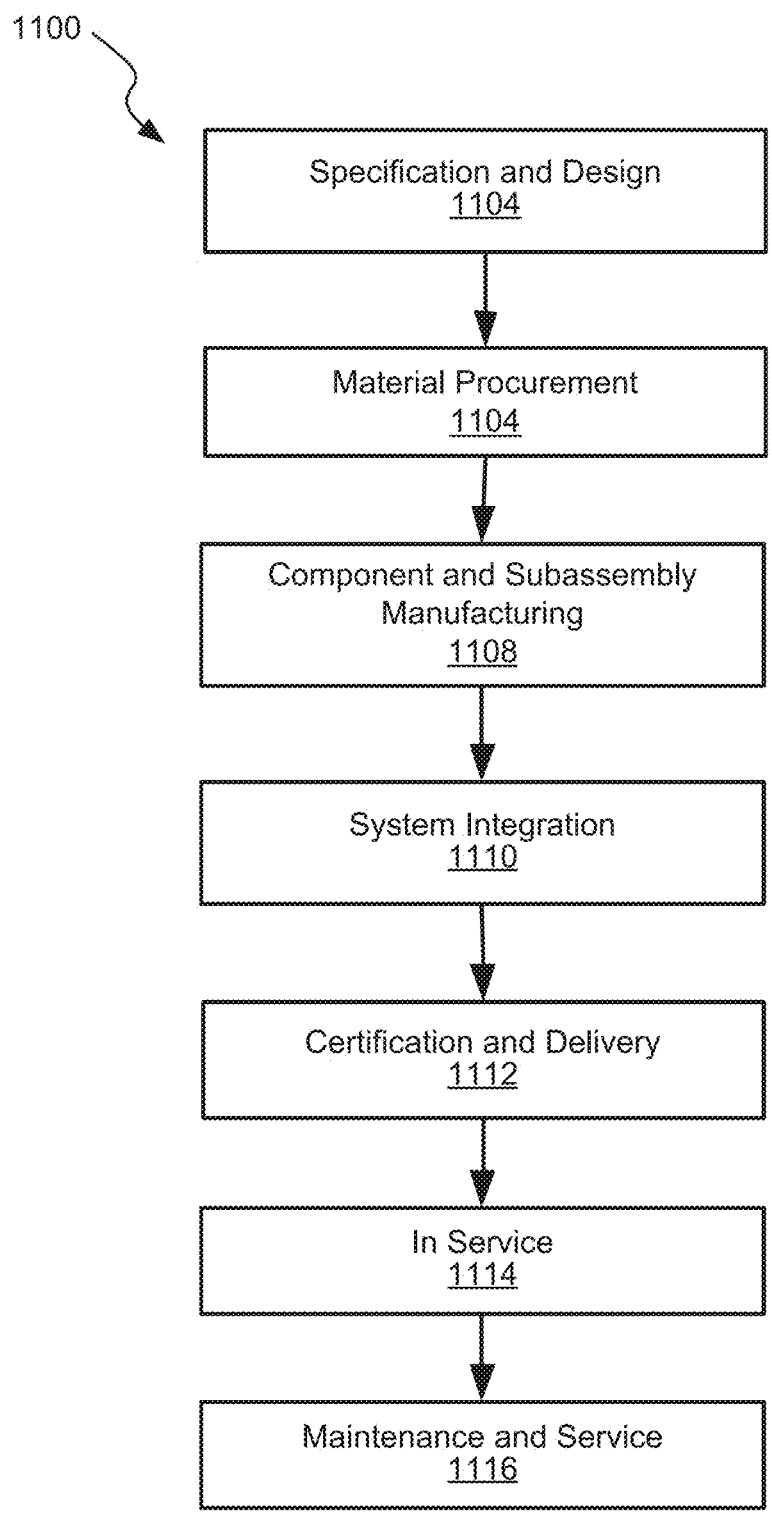
FIG. 7 is a block diagram of aircraft production and service methodology that may utilize methods and systems for curing composite structures without collapsing cavity sections as described herein.
Figure 8:
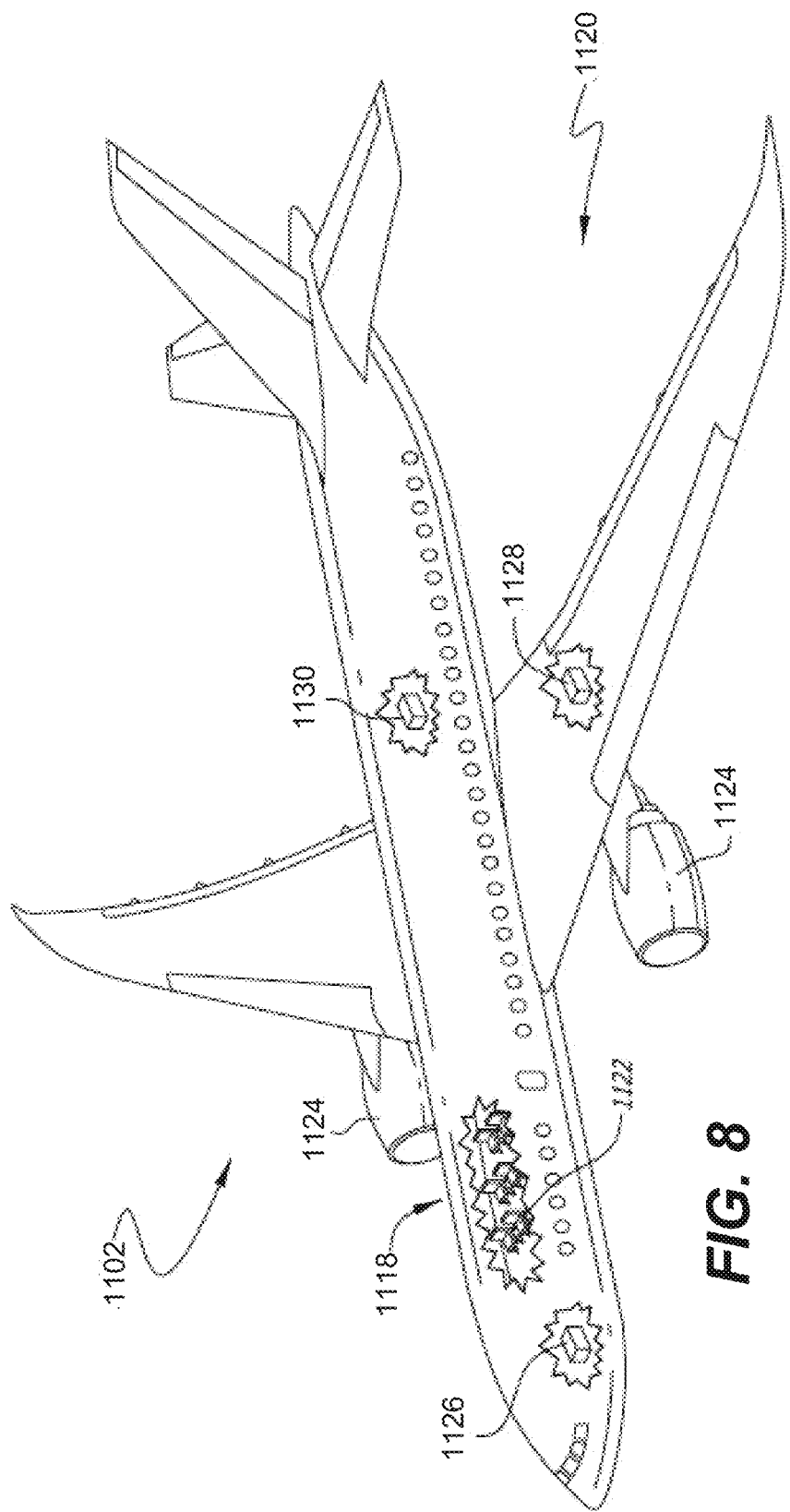
FIG. 8 is a schematic illustration of an aircraft that may include composite structures described herein.

Examples of the present disclosure may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and inspection system integration (block 1110) of aircraft 1102 may take place. Anisotropically stiff tools may be constructed, fitted, and installed on base structures during one or more of these stages. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more inspection systems of aircraft 1102. The described methods and systems may be used during operations 1104 and 1108 on the airframe and the interior.

Each of the processes of illustrative method 1100 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level inspection systems 1120 and interior 1122, which may include one or more anisotropically stiff tools. Examples of high-level inspection systems 1120 include one or more of propulsion inspection system 1124, electrical inspection system 1126, hydraulic inspection system 1128, and environmental inspection system 1130. Any number of other inspection systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1100). For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108) and (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of forming a composite structure, the method comprising:
    forming a composite layup;
    curing the composite layup thereby forming a tool; and
    after curing, changing a shape of the tool; and
    after changing the shape of the tool, bridging over a cavity of a base structure with the tool.

2. The method of claim 1, wherein changing the shape of the tool comprises changing a shape of a matrix resin of the tool.

3. The method of claim 2, wherein changing the shape of the matrix resin comprises breaking the matrix resin of the tool.

4. The method of claim 3, wherein the matrix resin is a thermoset resin.

5. The method of claim 3, wherein breaking the matrix resin of the tool increases flexibility of the tool along a first direction while stiffness of the tool in a second direction remains unchanged.

6. The method of claim 5, wherein the second direction is perpendicular to the first direction.

7. The method of claim 3, wherein the tool comprises a first set of continuous fibers and wherein continuity of the first set of continuous fibers is maintained while breaking the matrix resin of the tool.

8. The method of claim 2, wherein changing the shape of the matrix resin comprises heating of at least a portion of the tool.

9. The method of claim 8, wherein the matrix resin is a thermoplastic resin.

10. The method of claim 1, wherein the composite layup comprising a first unidirectional ply comprising a first set of continuous fibers.

11. The method of claim 10, wherein fibers in the first set of continuous fibers of the tool extend parallel to each other and extend across the cavity on the base structure.

12. The method of claim 11, wherein the fibers in the first set of continuous fibers of the tool and extend perpendicular to a primary axis of the cavity on the base structure.

13. The method of claim 10, wherein the composite layup further comprises a second unidirectional ply and a multidirectional ply such that the multidirectional ply is disposed between the first unidirectional ply and the second unidirectional ply, and wherein the second unidirectional ply comprises a second set of continuous fibers such that fibers in the second set of continuous fibers extend parallel to each other and to the first set of continuous fibers.

14. The method of claim 13, wherein the multidirectional ply comprises a woven fabric having a fiber orientation relative to the first set of continuous fibers selected for achieving a maximum flexibility about one direction.

15. The method of claim 1, wherein changing the shape of the tool comprises bending the tool around a bend axis, and wherein the bend axis is not parallel to a primary axis of the cavity on the base structure.

16. The method of claim 15, wherein the bend axis is perpendicular to the primary axis of the cavity on the base structure.

17. The method of claim 1, wherein the composite layup is cured on a mold having a planar surface.

18. The method of claim 1, wherein the base structure is used as a mandrel while changing the shape of the tool.

19. The method of claim 1, further comprising forming a composite structure over the tool such that the tool is disposed between the base structure and the composite structure.

20. The method of claim 19, wherein forming the composite structure comprises curing the composite structure while in the composite structure is disposed over the tool.

21. The method of claim 19, wherein a matrix resin of the composite structure and a matrix resin of the tool are same.

22. The method of claim 19, wherein the tool separates the composite structure from the cavity of the base structure.

23. An assembly comprising:
    a base structure comprising a cavity and a non-planar surface; and
    a tool contacting the non-planar surface of the base structure and extending over the cavity,
        the tool comprising a first set of continuous fibers,
        fibers of the first set of continuous fibers extending parallel to each other and across the cavity on the base structure.

24. The assembly of claim 23, wherein the tool comprises a matrix resin bent at a bend area of the tool.

25. The assembly of claim 24, wherein the bend area spans the cavity.

* * * * *